(12) United States Patent
Pereira et al.

(10) Patent No.: US 11,288,823 B2
(45) Date of Patent: Mar. 29, 2022

(54) LOGO RECOGNITION IN IMAGES AND VIDEOS

(71) Applicant: Gracenote, Inc., Emeryville, CA (US)

(72) Inventors: Jose Pio Pereira, Cupertino, CA (US); Kyle Brocklehurst, Mountain View, CA (US); Sunil Suresh Kulkarni, San Jose, CA (US); Peter Wendt, San Jose, CA (US)

(73) Assignee: Gracenote, Inc., Emeryville, CA (US)

( * ) Notice: Subject to any disclaimer, the term of this patent is extended or adjusted under 35 U.S.C. 154(b) by 129 days.

(21) Appl. No.: 16/841,681

(22) Filed: Apr. 7, 2020

(65) Prior Publication Data

US 2020/0372662 A1 Nov. 26, 2020

Related U.S. Application Data

(60) Continuation of application No. 16/018,011, filed on Jun. 25, 2018, now Pat. No. 10,614,582, which is a division of application No. 15/172,826, filed on Jun. 3, 2016, now Pat. No. 10,007,863.

(60) Provisional application No. 62/171,820, filed on Jun. 5, 2015.

(51) Int. Cl.
G06T 7/60 (2017.01)
G06T 7/33 (2017.01)
G06K 9/46 (2006.01)
G06K 9/62 (2022.01)
G06T 7/11 (2017.01)

(52) U.S. Cl.
CPC ............ *G06T 7/337* (2017.01); *G06K 9/4671* (2013.01); *G06K 9/6267* (2013.01); *G06T 7/11* (2017.01); *G06T 7/60* (2013.01); *G06K 9/4642* (2013.01); *G06K 2009/4666* (2013.01); *G06K 2209/25* (2013.01); *G06T 2207/20052* (2013.01)

(58) Field of Classification Search
CPC ... G06T 7/337; G06T 7/60; G06T 7/11; G06T 2207/20052; G06K 9/4671; G06K 9/6267; G06K 9/4642; G06K 2009/4666; G06K 2209/25
USPC ....... 382/100, 103, 141, 155, 156, 159, 181, 382/209, 217, 218, 190, 195, 173, 224; 707/736, 737, 754
See application file for complete search history.

(56) References Cited

U.S. PATENT DOCUMENTS 5,287,272 A * 2/1994 Rutenberg ......... G06K 9/00134
382/224
2010/0290701 A1* 11/2010 Puneet .................... G06T 7/155
382/164
2016/0042253 A1* 2/2016 Sawhney ............ G06F 16/3322
382/190

* cited by examiner

*Primary Examiner* — Sheela C Chawan
(74) *Attorney, Agent, or Firm* — McDonnell Boehnen Hulbert & Berghoff LLP

(57) ABSTRACT

Methods, apparatus, systems and articles of manufacture of logo recognition in images and videos are disclosed. An example method to detect a specific brand in images and video streams comprises accepting luminance images at a scale in an x direction Sx and a different scale in a y direction Sy in a neural network, and training the neural network with a set of training images for detected features associated with a specific brand.

20 Claims, 14 Drawing Sheets

LOGO RECOGNITION IN IMAGES AND VIDEOS

RELATED APPLICATION

This disclosure is a continuation of U.S. patent application Ser. No. 16/018,011 which was filed on Jun. 25, 2018, which is a continuation of U.S. patent application Ser. No. 15/172,826 which was filed on Jun. 3, 2016, which claims the benefit of U.S. Provisional Patent Application No. 62/171,820, which was filed on Jun. 5, 2015. U.S. patent application Ser. No. 16/018,011, U.S. patent application Ser. No. 15/172,826, and U.S. Provisional Patent Application No. 62/171,820 are hereby incorporated herein by reference in their entireties.

U.S. patent application Ser. No. 12/141,337 filed on Jun. 18, 2009 entitled "Method and Apparatus for Multi-dimensional Content Search and Video Identification" now issued as U.S. Pat. No. 8,171,030; U.S. application Ser. No. 12/141,163 filed on Jun. 18, 2008 entitled "Methods and Apparatus for Providing a Scalable Identification of Digital Video Sequences" now issued as U.S. Pat. No. 8,229,227; U.S. patent application Ser. No. 12/772,566 filed on May 3, 2010 entitled "Media Fingerprinting and Identification System" now issued as U.S. Pat. No. 8,195,689; U.S. application Ser. No. 12/1788,796 filed on May 27, 2010 entitled "Multi-Media Content Identification Using Multi-Level Content Signature Correlation and Fast Similarity Search" now issued as U.S. Pat. No. 8,335,786; U.S. application Ser. No. 13/102,479 filed on May 6, 2011 entitled "Scalable, Adaptable, and Manageable System for Multimedia Identification" now issued as U.S. Pat. No. 8,655,878; and U.S. application Ser. No. 13/276,110 filed on Oct. 18, 2011 entitled "Distributed and Tiered Architecture for Content Search and Content Monitoring" now issued as U.S. Pat. No. 8,959,108, all of which are incorporated by reference herein in their entirety.

FIELD OF THE DISCLOSURE

The present invention relates generally to methods for advertising, content retrieval, media monitoring, image and video processing. More specifically, the present invention relates to use of logo recognition, text detection, optical character recognition (OCR), machine learning techniques including neural net classifiers and support vector machines (SVM).

BACKGROUND

Sponsored advertising is a large and dynamic business segment with more than $55 billion spent in 2014. The resulting ecosystem of sponsored advertising includes measurement for potential value of targets (teams, celebrity, retail, stadium spaces) and actual value as measured by "earned viewership" or promotion of the advertising brand. Harvesting of user generated content for displaying or content marketing is another business segment enabled by logo recognition systems. Additionally "competitive brand intelligence" of all media content including online videos, broadcast or streaming video, social images and outdoor display is another use case for more accurate logo recognition systems. Other applications include measurement of product placement within stores, detection and localization of products in retail aisles for a better shopping experience and to provide information for retail management. Additionally, other applications include logistics and industrial applications.

However, current solutions for logo recognition have various limitations. One constraint is time and cost to train a system to recognize new logos due in part to the effort to collect large numbers of trainable images. Another limitation is the accuracy to detect various types of logos in the presence of significant warp, occlusion, blur and varying lighting conditions. Another limitation of general current solutions is a weakness in detecting tiny and often distorted logos on cloth, such as logos located on banners and apparel. Another weakness of such systems is the limited number of logos that can be recognized which is often limited due to accuracy of both current feature detectors that use bag of words methods and learning methods such as neural network classifiers.

In one or more of its several aspects, the present invention addresses problems such as those described above. For example, a method for logo recognition in accordance with an aspect of the present invention may suitably use saliency analysis, segmentation techniques, and character stroke analysis as addressed further herein to segment likely logo regions. Saliency detection relies on the fact that logos have significant information content compared to the background. Multi-scale similarity comparison is performed to remove less interesting regions such as text strings within a sea of text or objects in large sets of objects, such as faces in a sea of faces.

To achieve high robustness and accuracy of detection, multiple methods are used to recognize a logo in images and videos and further verify with feature matching and neural net classification, the accuracy of detection of a likely logo. The methods for logo recognition include feature extraction, signature representation, matching, making use of neural network classification, and optical character recognition.

One aspect of the invention presents a method for optical character recognition (OCR) with a character based segmentation and multi character classifiers. Another method uses stroke analysis and heuristics to select one or more text classifiers for use in recognition. An alternate method for OCR performs segment level character recognition with one or more of selected text classifiers and N-gram matching as addressed further herein.

Another aspect of the invention presents a first method to train classifiers to new objects and logos with synthetically generated images. Another aspect utilizes a second method that utilizes transfer learning features of neural networks. In transfer learning, a neural network is trained to learn interesting and important features for classification, and the trained network is then fine-tuned with a specific training set. The neural network is trained with a large set of images including images that may not be relevant to the classified categories and the neural network and weights are saved. These saved weights and the neural network configuration are improved with further training with the specific logo categories that need classification, while refining the neural network and training a new classification layer. The method using synthetic images for training and the method for transfer learning enable fast addition of new logos into a recognition system, and can be further refined with more data and feedback to improve accuracy.

Another aspect of the invention improves and extends the methods for feature based signature generation. One method combines neighboring detected keypoints with an affine Gaussian Hessian based detector to generate an additional keypoint having a larger feature keypoint region. The additional keypoint improves the accuracy of matching by providing more robust features that can help match the logo. Another method describes lines in the keypoint region to better represent line-based logos and objects and generates complementary and accurate signatures of the detected logo. The signatures generated with the extended feature methods may suitably be employed to detect logos in new images as part of an indexed search and correlation system.

Another aspect of the invention presents methods to verify and iterate around possible matching regions. A likely logo match is verified with a logo specific neural network classifier and a feature based matcher.

Another embodiment applies a method to detect a logo in images in video frames selected from a video stream. A saliency analysis and segmentation of selected regions are applied in a selected video frame to determine segmented likely logo regions. The segmented likely logo regions are processed with feature matching using correlation to generate a first match, neural network classification using a convolutional neural network to generate a second match, and text recognition using character segmentation and string matching to generate a third match. A most likely logo match is decided by combining results from the first match, the second match, and the third match.

Another embodiment addresses a method to detect a brand in images and video streams for broadcast video. A detected product and logos are tracked and segmented to measure and determine a brand. A location of the detected product is identified on a display. The logo is classified as wearable, banner, or fixture. The product and brand are mapped to a three dimensional (3D) map of an event where the product and logo were detected.

A further embodiment addresses a method to detect a specific brand in images and video streams. Luminance images at a scale in the x direction Sx and a different scale in the y direction Sy are accepted in a neural network. The neural network is trained with a set of training images for detected features associated with a specific brand.

These and other features, aspects, techniques and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a non-transitory computer-readable storage medium having computer-usable program code embodied in the medium. Any suitable non-transitory computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A non-transitory computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1A:
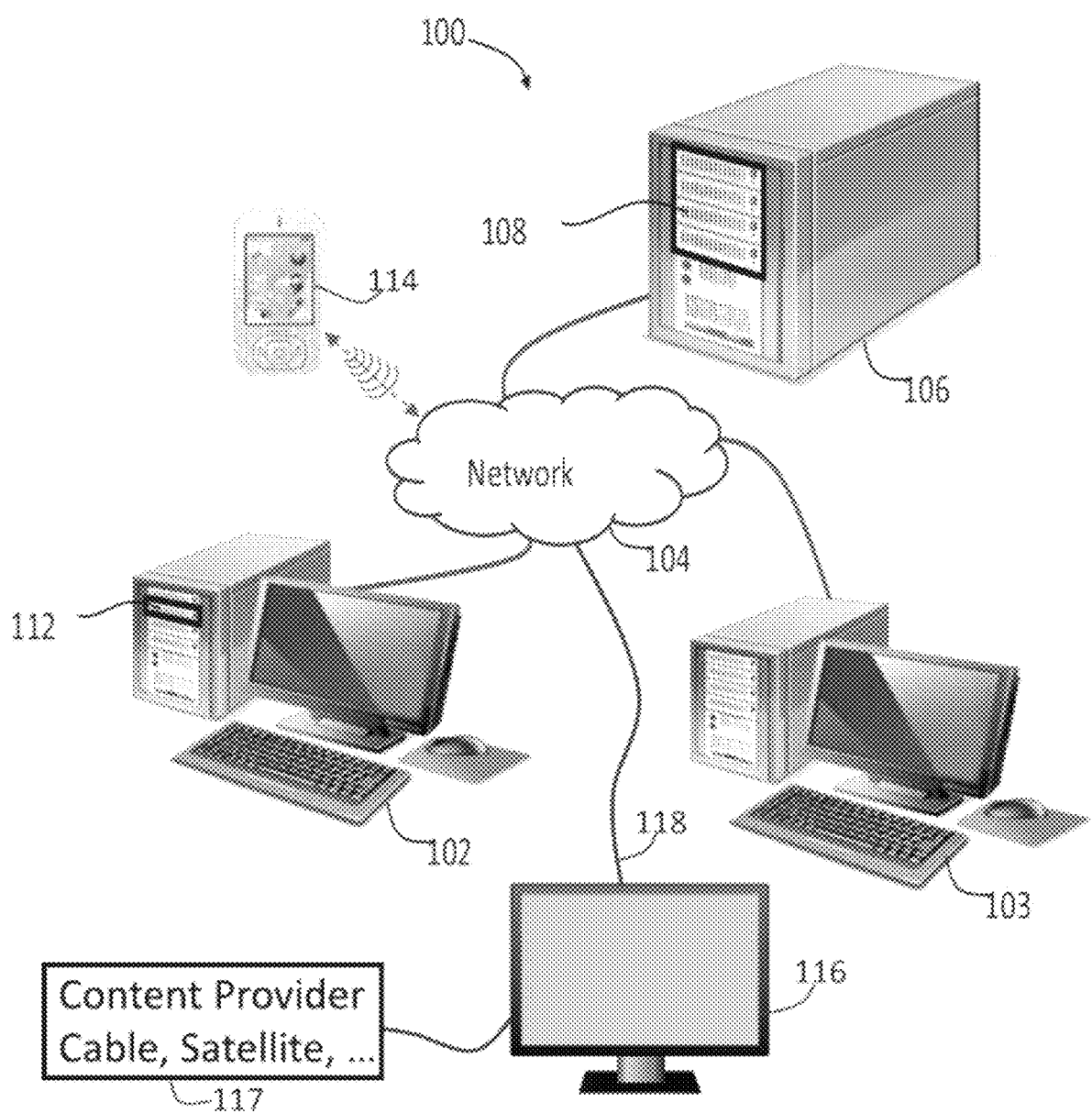
FIG. 1A illustrates a media recognition system that includes image and video content recognition, logo recognition, fingerprinting, and searching operations in accordance with an embodiment of the present invention.

FIG. 1A illustrates a media recognition system 100 that includes image and video content recognition, fingerprinting, logo recognition, and searching operations in accordance with an embodiment of the present invention. The media recognition system 100 includes user sites 102 and 103, a server 106, a video database 108, a remote user device 114, such as a smartphone, with a wireless connection to the server 106, a media presentation device 116, such as a television (TV), laptop, tablet, smartphone, or the like, and an exemplary image and video content identification and fingerprinting process 112 operated, for example, by user site 102. The video identification process includes image content recognition, such as logo recognition, by using various techniques as described herein including optical character recognition (OCR) and use of neural network classifiers. The remote user device 114 is representative of a plurality of remote user devices which may operate as described in accordance with embodiments of the present invention. The media presentation device 116 connects to a content provider 117, such as provided by a cable delivery service, a satellite service, a digital video device (DVD) player, or the like. The media presentation device 116 may also connect to the network 104 for Internet and intranet access, by use of a cable 118, for example, wireless or network connection. A network 104, such as the Internet, a wireless network, or a private network, connects sites 102 and 103, media presentation device 116, and server 106. Each of the user sites, 102 and 103, remote user device 114, media presentation device 116, and server 106 may include a processor complex having one or more processors, having internal program storage and local user controls such as a monitor, a keyboard, a mouse, a printer, and may include other input or output devices, such as an external file storage device and communication interfaces.

The user site 102 may comprise, for example, a personal computer, a laptop computer, a tablet computer, or the like equipped with programs and interfaces to support data input and output and video content identification, fingerprinting and search monitoring that may be implemented both automatically and manually. The user site 102 and the remote user device 114, for example, may store programs, such as the image and video content identification and fingerprinting process 112, which is an implementation of a content-based video identification process of the present invention. The user site 102 and the remote user device 114 also have access to such programs through electronic media, such as may be downloaded over the Internet from an external server, accessed through a universal serial bus (USB) port from flash memory, accessed from disk media of various types, or the like. The media recognition system 100 may also suitably include more servers and user sites than shown in FIG. 1A. Also, multiple user sites each operating an instantiated copy or version of the image and video content identification and fingerprinting process 112 may be connected directly to the server 106 while other user sites may be indirectly connected to it over the network 104.

User sites 102 and 103 and remote user device 114 may generate user video content which is uploaded over the Internet 104 to a server 106 for storage in the video database 108. The user sites 102 and 103 and remote user device 114, for example, may also operate the image and video content identification and fingerprinting process 112 to generate fingerprints and search for video content in the video database 108. The image and video content identification and fingerprinting process 112 in FIG. 1A is scalable and utilizes highly accurate video fingerprinting and identification technology as described in more detail below. The process 112 is operable to check unknown video content against a database of previously fingerprinted video content, which is considered an accurate or "golden" database. The image and video content identification and fingerprinting process 112 is different in a number of aspects from commonly deployed processes. For example, the process 112 extracts features from the video itself rather than modifying the video. The image and video content identification and fingerprinting process 112 allows the server 106 to configure a "golden" database specific to business requirements. For example, general multimedia content may be filtered according to a set of guidelines for acceptable multimedia content that may be stored on the media recognition system 100 configured as a business system. The user site 102, that is configured to connect with the network 104, uses the image and video content identification and fingerprinting process 112 to compare local video streams against a previously generated database of signatures in the video database 108. The terms fingerprints and signatures may be used interchangeably herein.

The video database 108 may store video archives, as well as data related to video content stored in the video database 108. The video database 108 also may store a plurality of video fingerprints that have been adapted for use as described herein and in accordance with the present invention. It is noted that depending on the size of an installation, the functions of the image and video content identification and fingerprinting process 112 and the management of the video database 108 may be combined in a single processor system, such as user site 102 or server 106, and may operate as directed by separate program threads for each function.

The media recognition system 100 for both image and video content recognition and media fingerprinting is readily scalable to very large multimedia databases, has high accuracy in finding a correct clip, has a low probability of misidentifying a wrong clip, and is robust to many types of distortion as addressed further herein. The media recognition system 100 uses one or more fingerprints for a unit of multimedia content that are composed of a number of compact signatures, including cluster keys and associated metadata. The compact signatures and cluster keys are constructed to be easily searchable when scaling to a large database of multimedia fingerprints. The multimedia content is also represented by many signatures that relate to various aspects of the multimedia content that are relatively independent from each other. Such an approach allows the system to be robust to distortion of the multimedia content even when only small portions of the multimedia content are available. This process is described in U.S. Pat. No. 8,189, 945 issued May 29, 2012 entitled "Digital Video Content Fingerprinting Based on Scale Invariant Interest Region Detection with an Array of Anisotropic Filters" which is assigned to the assignee of the present application and incorporated by reference herein in its entirety.

Multimedia, specifically audio and video content, may undergo several different types of distortions. For instance, audio distortions may include re-encoding to different sample rates, rerecording to a different audio quality, introduction of noise and filtering of specific audio frequencies or the like. Sensing audio from the ambient environment allows interference from other sources such as people's voices, playback devices, and ambient noise and sources to be received. Video distortions may include cropping, stretching, re-encoding to a lower quality, using image overlays, or the like. While these distortions change the digital representation, the multimedia is perceptually similar to undistorted content to a human listener or viewer. Robustness to these distortions refers to a property that content that is perceptually similar will generate fingerprints that have a small distance according to some distance metric, such as Hamming distance for bit based signatures. Also, content that is perceptually distinct from other content will generate fingerprints that have a large distance, according to the same distance metric. A search for perceptually similar content, hence, is transformed to a problem of searching for fingerprints that are a small distance away from the desired fingerprints.

One aspect of the invention presents a method to identify brands and logos of content on screen by capturing the audio and video data from the mobile device, from web sites, streaming video, social media, broadcast television, over-the-top (OTT) video and then using the techniques described herein to identify the brands. For example, if a user is playing a movie accessed from a streaming media provider, a logo for the streaming media provider is presented on a display at various times while the movie is playing. By identifying the logo, the streaming media provider may be recognized and with ancillary information, such as time and location where the movie is playing, the movie may also be recognized. In a similar manner, if the user is playing a game on a TV console or other media presentation device, for example, a logo of the game, a logo of a developer of the game, game title and content, and other images may be recognized, such as game characters, utilizing embodiments of the invention described herein. Additionally, recognizing logos for network channels, TV commercials, live broadcasts, over the top (OTT) providers, and the like, may play a role in identifying media content being played or advertised.

Another example of a method for logo recognition uses saliency analysis, segmentation techniques, and stroke analysis to segment likely logo regions. The saliency of an item is a state or quality by which the item stands out relative to its neighbors. Saliency detection relies on the fact that logos have significant information content compared to the background the logo is placed against. Multi-scale comparison is performed to remove less interesting regions around a suspected logo, such as text strings within a sea of text, and objects in large sets of objects, such as faces or a small number of faces in a sea of faces.

To achieve high robustness and accuracy of detection, the methods described herein are used to recognize a logo in images and videos and further verify a likely candidate logo with feature matching and neural net classification. The methods for logo recognition include feature matching, neural network classification and optical character recognition.

One aspect of the invention presents a method for optical character recognition (OCR) with a character based segmentation and multi character classifiers. Another method uses stroke analysis and heuristics to select one or more of text classifiers for recognition. An alternate method for OCR performs segment level character recognition with one or more of selected text classifiers and N-gram matching.

Another aspect of the invention presents a method to train classifiers to identify new logos and objects with synthetically generated images. Another aspect utilizes transfer learning features of neural networks. Both these methods enable fast addition of new logos into a recognition system, and can provide further refinement with more data and feedback to improve accuracy.

Another aspect of the invention improves and extends the methods for feature based signature generation. One method combines neighboring detected keypoints with an affine Gaussian Hessian based detector to generate a larger feature keypoint. For any object in an image, interesting points on the object can be extracted to provide a "feature description" of the object. This feature description, when extracted from a training image, can then be used to identify the object image when attempting to locate the object in a test image containing many other objects. To perform reliable recognition, the features extracted from the training image should be detectable even under changes in image scale, noise and illumination. Such feature points usually lie on high-contrast regions of the image, such as object edges. These interesting points in an image are termed "keypoints".

The detection and description of local image features can help in object recognition. The local image features are detected based on the appearance of the object at particular interest points, and are generally invariant to image scale and rotation. The local image features are also generally robust to changes in illumination, noise, and minor changes in viewpoint. In addition to these properties, the local image features are usually highly distinctive, relatively easy to extract and allow for correct object identification with low probability of mismatch. Recognition can be performed in close-to-real time, at least for small databases and on modern computer hardware.

Another method describes the lines in an object or a possible logo in context of its neighbor lines to better represent line based logos and objects. The method then generates signatures for the line based logo. The signatures generated with extended feature methods are used to detect logos by an indexed search and correlation system, such as using a compact hash signature, also referred to as a traversal index, generated from an original descriptor, as an address to the associated content.

In another embodiment of the invention, methods are presented to verify and iterate over possible logo matches. Since a detected likely logo may be partially matched or matched incorrectly, more specialized methods as described herein are applied in an iterative manner to provide additional verification of a match. For example, a likely logo match is detected and then verified with a logo specific neural network classifier and a feature based matcher. An initial neural network classifier that was trained with a plurality of logo images, such as a thousand or more logos, may generate a likely logo match with low confidence in its accuracy. By retraining the neural network with an expected brand logo, the likely logo match is verified more accurately to be a positive match or determined to be a false match. In an alternative embodiment, the accuracy of detecting a logo based on partial matches at points in a region of an image frame, may be improved by expanding the region, or merging the region with other close-by regions and then reprocessing the expanded keypoint region to increase the confidence in the match.

In another embodiment of the invention, methods are presented to configure a convolution neural network to input multi-scale and different image representations, optimize the neural network parameters, utilize rectified linear unit (RELU) neuron outputs, use of a dropout regularization method, and use of a combination of max and average pooling at different stages of the neural network.

In another embodiment of the invention, methods are presented to segment word characters using analysis of contours of connected components, stroke analysis and stroke heuristics.

In another embodiment of the invention, methods are presented for retail display management. This includes receiving a video stream or sequence of images which are processed to generate video frames from which images are tracked on selected video frames. Identified images are segmented to identify and localize a selected product. For example, a logo may be identified in a selected video frame as a particular brand and a detected image may be recognized as particular product of that identified brand. Further, feature alignment and previous knowledge of product locations are used to create a three dimensional (3D) physical map of products including the selected product as displayed in the retail environment. With this 3D physical map of all the products, applications for retail management, product display management and a better shopping experience are enabled.

Video frames are selected from a sequence of video frames for processing by many methods. For example, for a 30 second TV commercial, a predetermined number of video frames, such as five video frames, are selected. These five video frames are selected by combination of various methods, such as determining a scene change has occurred in a video frame, tracking of logo regions in the selected video frames, and selecting video frames for regions that are relatively larger, and of longer duration across multiple frames.

In another embodiment of the invention, methods are presented for tracking selected logos that are displayed at an identified broadcasted event. This includes receiving a video stream and processing to track one or more images on selected video frames and to segment the one or more images to identify and localize a selected logo. Feature alignment and previous knowledge of logo locations are used to create a 3D physical map of logos displayed at the actual event or locale such as a stadium. With this 3D physical map of all the logos displayed, a dynamic accounting of dynamic displays is performed. For example, with an event broadcast from a specific location, mapping the logo display to a physical location is very useful. From the 3D physical map, a separate analysis is performed to evaluate the viewability of a product, a logo, or both to an audience or to foot and vehicle traffic. Since advertising value is a function of views and quality and size of logo and product display, this measurement is very valuable for trading of advertising display services. Dynamic measurement is also valuable as advertisers may prefer to optimize their spending to cost and targeting of a relevant demographic.

Figure 1B:
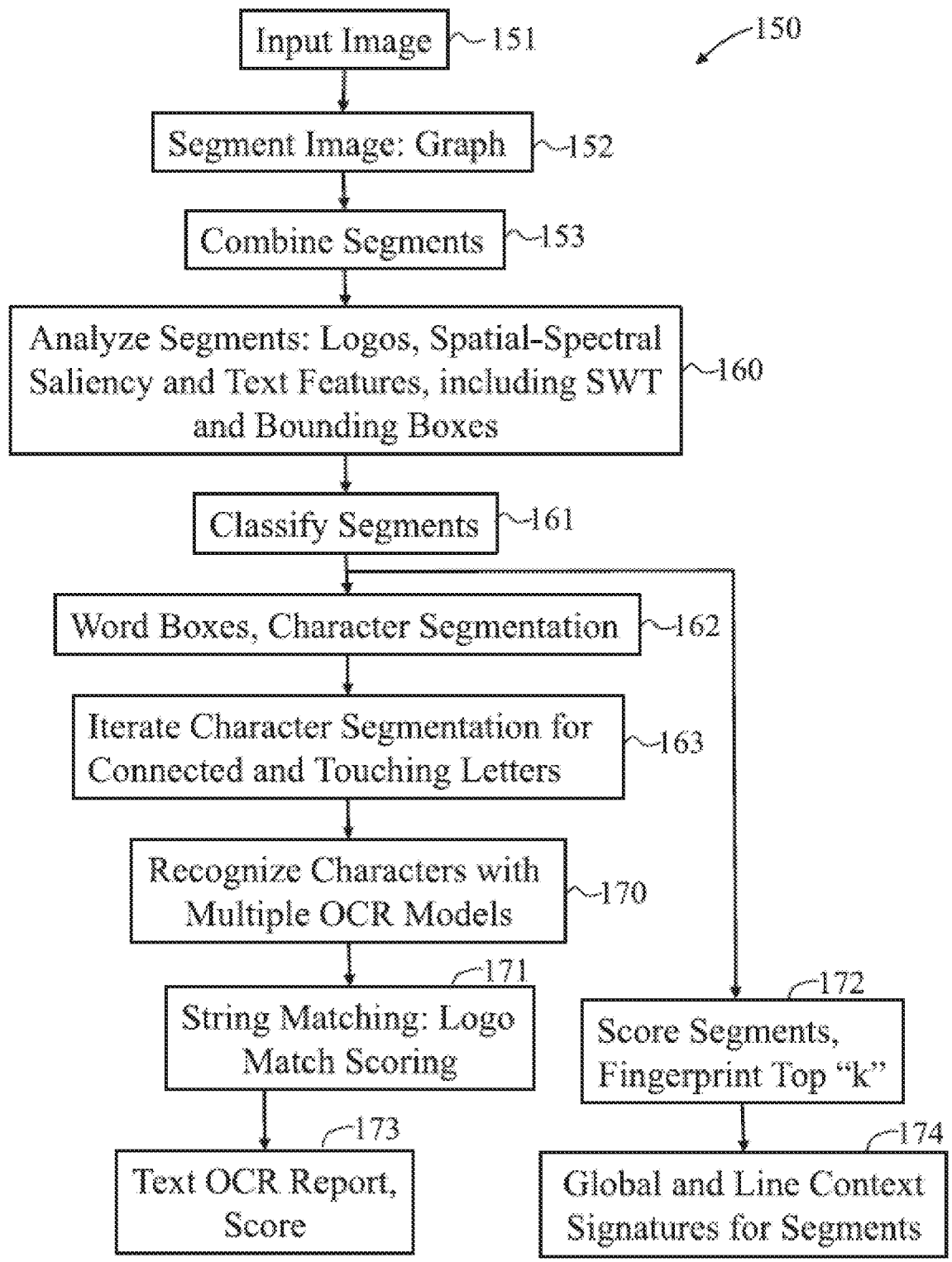
FIG. 1B illustrates a flowchart of a process for image segmentation and processing for logos in accordance with an embodiment of the present invention.

FIG. 1B illustrates a flowchart of a process 150 for image segmentation and processing for logos in accordance with an embodiment of the present invention. The process 150 comprises steps to segment an image, to combine and select regions using saliency, including both spectral and spatial analysis, using stroke width transform (SWT) analysis capabilities, and using edge and contour processing techniques. The saliency of an item is a state or quality by which the item stands out relative to its neighbors in the same context. The process 150 also includes use of character segmentation, character recognition, and string matching.

An image is input at step 151 and is segmented at step 152 with a preferred fast segmentation method. In one embodiment, the input image is a frame, or an image located within a frame, selected from a video captured by a camera, such as a camera on the remote user device 114, such as a smartphone. The input image may also be selected from a video stored on a digital video disc (DVD), selected from a video accessed from broadcast streaming media, or selected from media downloaded from the Internet, or the like. The video when initially received may be in an encoded format, such as the moving picture experts group (MPEG) format. In another embodiment, the image is a single image that when initially received may be in an encoded format, such as the joint photographic experts group (JPEG) format. Encoded formats are decoded at step 151.

A presently preferred fast segmentation method is a graph based segmentation approach that sorts neighbor pixel vectors by their differences and identifies regions according to minimum-area and region-value (intensity or color) thresholds. Segments are combined if they are adjacent and similar to each other. Segments are classified as separate if they are not adjacent or if the segments are not similar to each other even if the segments are adjacent. For example, an image of a capital "T" has a horizontal segment and a vertical segment. The horizontal segment would be classified as not similar to the vertical segment even though the two segments are adjacent, they are not similar.

Next, at step 160, each of the segments is analyzed for different properties. For example, a first property includes text like properties determined using stroke width transform (SWT) analysis to generate stroke statistics and heuristics. A stroke-width transform analyzes an image to create a second image in which (a) background pixels are 0-valued and (b) every pixel in a foreground stroke or region has a value equal to an estimated minimum width of the region or stroke through that pixel. From this, a connected-component analysis is done, which labels each separate foreground stroke or region with a different integer label and can compute a minimum bounding box for said stroke or region. By using the shapes, positions, and sizes of the thus listed strokes/regions, and values computed from the pixels within each stroke/region area in the original and transform images, text-like strokes can be discriminated from other image features and groups of text-like strokes, candidates for letters and words, discriminated from isolated or spurious strokes that have no significance.

A second property determined at step 160 includes segment statistics such as density and use of a color space. A color space is a means of uniquely specifying a color within a region. There are a number of color spaces in common usage depending on the particular industry and/or application involved. For example, humans normally determine color by parameters such as brightness, hue, and colorfulness. On computers, it is more common to describe a color by three components, normally red, green, and blue. A third property includes spectral saliency determined by using a discrete cosine transform (DCT) of each local region. A fourth property includes spatial multi-scale saliency determined from the DCT results by calculating similarity for a hue, saturation, value (HSY) representation of an image histogram and for a gradient orientation histogram.

At step 161, segments are classified into segments that are logo-like or segments that are non-logo like. Segments, selected according to the properties determined at step 160, are compared to ground truth segments. Ground truth segments include sets of logo-like and sets of non-logo like segments that are used to train the classifier at step 161. Ground truth logo-like segments are segments that match segments in actual logos. At step 162, classified segments that are identified as logo-like segments are further segmented into characters using, for example, contour analysis of connected components, stroke width transform analysis and stroke density analysis, including analysis of a number of horizontal and vertical strokes and number of loops, stroke transition analysis, and use of stroke heuristics to segment the image into characters.

At step 163, an iterative step is performed for connected and touching letters to segment the characters using stroke transition analysis and stroke heuristics.

At step 170, the segmented characters are recognized using one or more text classifiers with one or more optical character recognition (OCR) models. In the preferred embodiment, two classifiers are used to allow different types of fonts. For example, a first classifier is used for bold fonts and a second classifier is used for fonts with shadows. Further classifiers may be added for cursive bold fonts and another classifier for combination of all standard fonts. At step 171, string matching is performed. String matching allows consideration of frequently occurring words with reduced weight in string match scoring for commonly occurring words or sub-strings. At step 173, the output includes an optical character recognition (OCR) report, a score from the string matching per brand at segment and image level, and a likely matching logo.

At step 172, the classified segments from step 161 are sorted by their logo like properties and only the top k segments are selected for next stage processing via feature analysis, signature generation, and passing the classified segments for neural network classification. The parameter "k" is a predetermined number which is set to a specific number, such as 20, that represents a maximum number of logo-like segments that should be processed per image. Also, at step 172, the regions are sorted by logo-like properties and selected segments are fingerprinted. One fingerprinting approach is a global method which uses gradients and trend and phase agreement to create a descriptor and then generate the signatures. Additional fingerprints generated are line context signatures of detected keypoint regions. Line-context signatures are derived from line-context descriptors and a line-context descriptor is a set of parameter values organized in consecutive order and derived from lines and edges detected as passing through an area centered on a keypoint. Signatures are generated for original detected keypoints, as well as, for extended or combined keypoint regions. At step 174, outputs are generated, such as global and line context signatures for segments.

Figure 2:
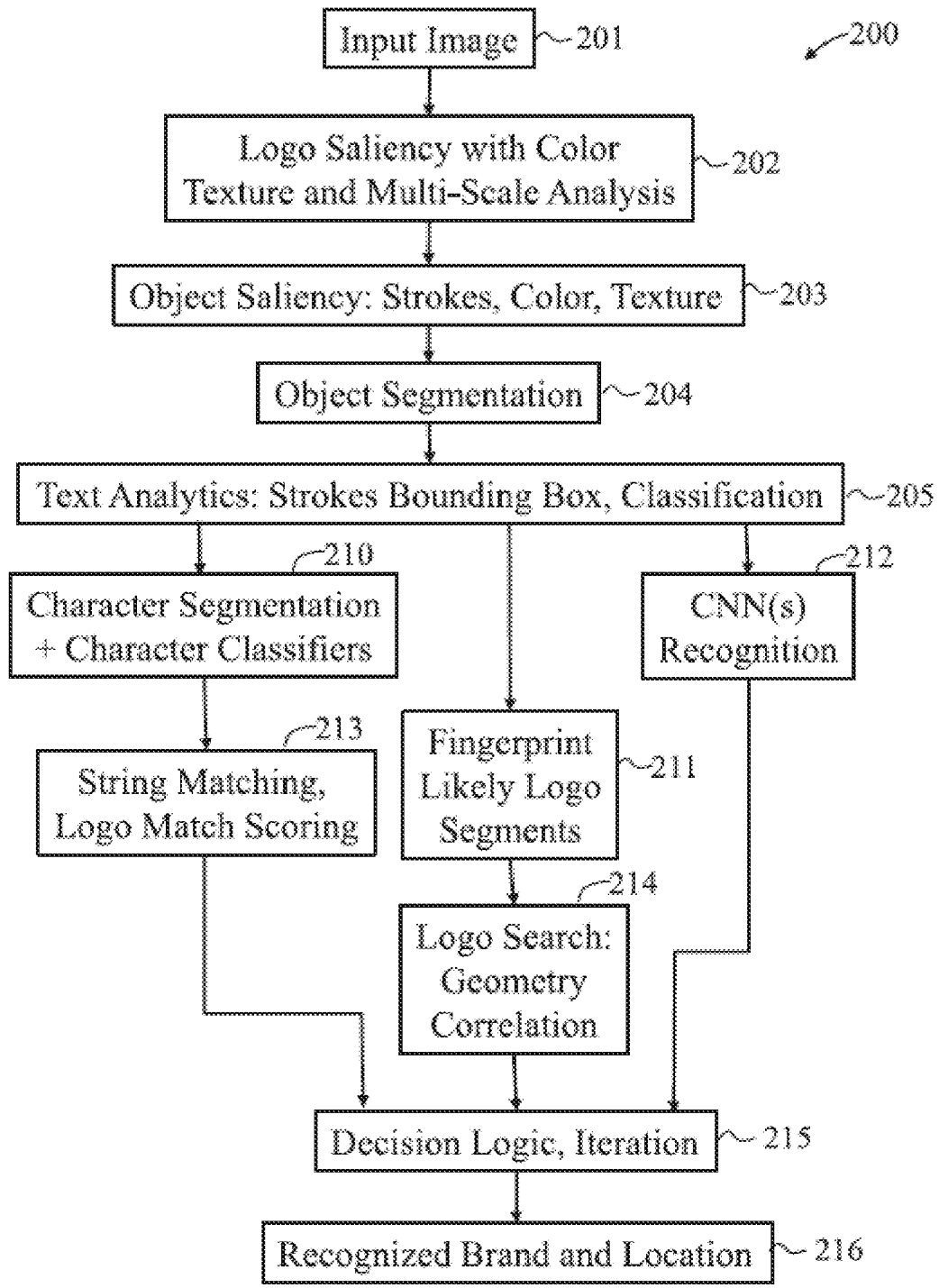
FIG. 2 illustrates a flowchart of a process for logo recognition including image processing, logo detection and recognition in accordance with an embodiment of the present invention.

FIG. 2 illustrates a flowchart of a process 200 for logo recognition including image processing, logo detection and recognition in accordance with an embodiment of the present invention. The process 200 describes a presently preferred embodiment to detect logos in images and video frames. An image is input at step 201 in a similar manner as described above with regard to step 151. At step 202, the input image is processed to identify likely locations of logos and objects. Multiple local regions are analyzed for different properties, including spectral saliency using a discrete cosine transform (DCT) of each local region and spatial multi-scale saliency of each local region determined by calculating similarity for a hue, saturation, value (HSY) histogram and for a gradient orientation histogram. Thus, likely locations for logos and objects are identified within the input image.

At step 203, logo and object saliency is determined according to segment statistics such as density, color space values and being text-like as determined by using a stroke width transform (SWT) and generating stroke statistics and heuristics. Optionally, saliency for each image region is determined with spatial multi-scale similarity by comparing the HSY histogram and for determining gradient orientation histograms for multiple scales at each likely logo region.

At step 204, segmentation is performed in the region of interest using a masked version of a graph cuts segmentation or any other accurate and fast segmentation method. At step 205, a stroke width analysis is performed to establish bounding boxes, such as word boxes around likely logo character strings, for selected regions and likely logo segments for further logo recognition analysis.

A high level process flow, shown below, illustrates steps for text recognition which include: Logo candidates→word boxes→character segmentation→character recognition (multiple classifiers)→string matching→logo recognition scores.

With reference to FIG. 2, at step 210, character segmentation and character classification includes a first process to produce logo candidates. A second process is employed to analyze each of the logo candidates and for each logo candidate, produce a set of word boxes. A third process analyzes each of the word boxes and produces a set of character segmentations to delineate the characters in likely logo character strings. A fourth process uses multiple classifiers to analyze each set of character segmentations to detect character words. At step 213, a fifth process uses string matching on the detected character words and provides logo match scoring.

At step 211, signatures are generated for likely logo segments identified in step 205. At step 214, segment fingerprints are searched against a two stage indexed search system which holds reference logo signatures. For any likely matches, geometric correlation is further performed. Alternatively, a stop word process in performed to 10 eliminate common signatures, or visual words, from the reference signature index. The signature generation flow has information measuring steps, as well as uniqueness analysis steps to transfer only unique and more robust logo segment signatures for further processing.

At step 212, convolutional neural networks (CNNs) are used to classify the incoming likely logo segment into a likely logo.

In one embodiment of logo classification or logo selection, regions with text, as determined by stroke width transform (SWT) analysis and use of stroke width heuristics, are preserved.

At step 215, decision logic is applied to results from steps 212, 213, and 214 to decide whether a likely match as reported by OCR analysis from step 213, by logo segment signatures analysis from step 214, or by use of CNNs in the classification analysis from step 212, is correct. At step 215, the likely matches can be further verified by specific logo feature matching or by use of a specific logo neural network. Iteration around selected regions, identified in steps 202-205, is used to improve on a likely match or to eliminate false matching. Based upon the results from the decision logic and iterations of step 215, a brand is recognized and the identified brand's associated placement in a location or locations are reported at step 216.

Figure 3:
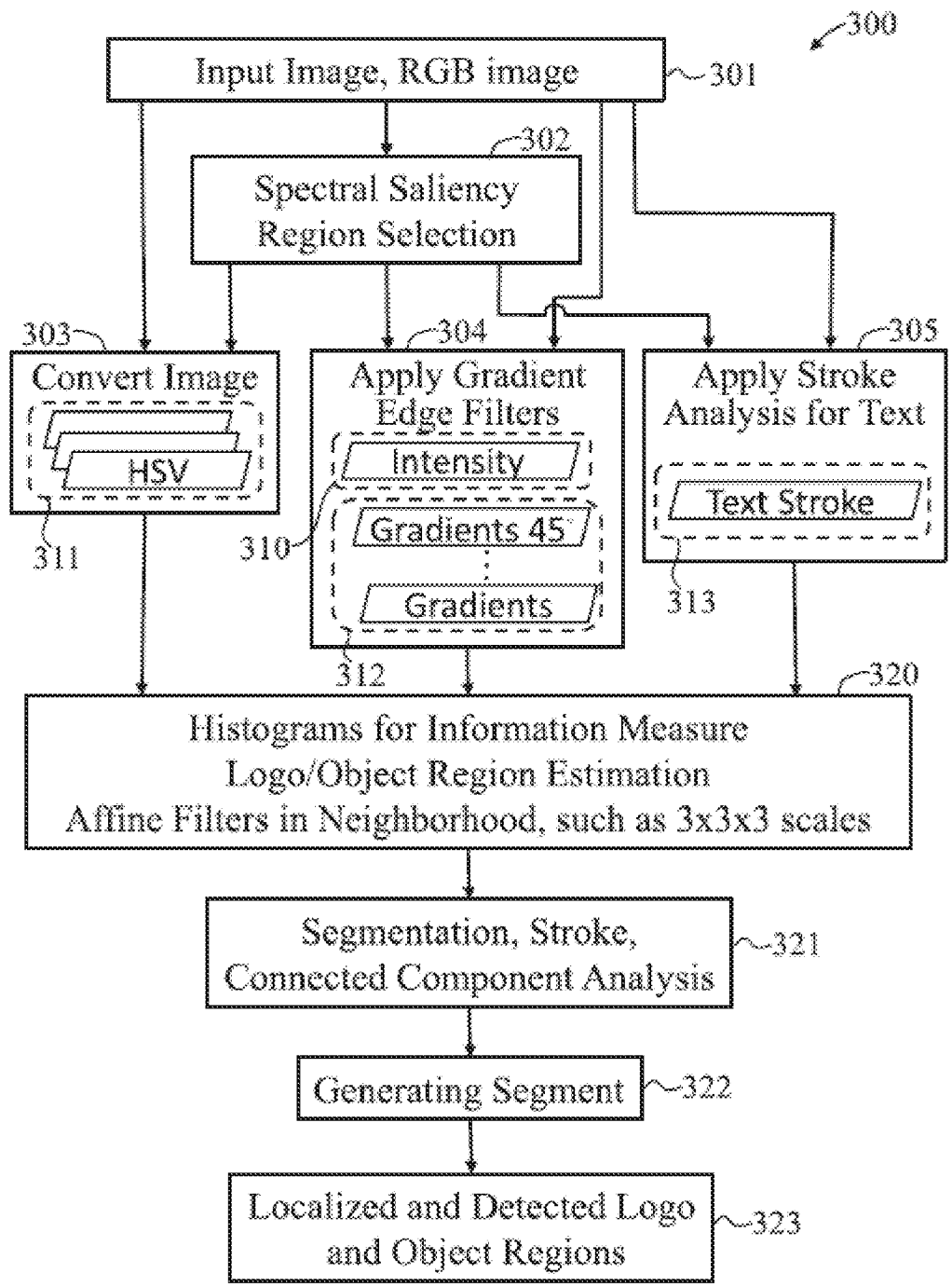
FIG. 3 illustrates a flowchart of a process for spectral, spatial and stroke analysis for logo region detection in accordance with an embodiment of the present invention.

FIG. 3 illustrates a flowchart of a process 300 for spectral, spatial and stroke analysis for logo region detection in accordance with an embodiment of the present invention. The process 300 describes the steps that select and segment logo-like regions. An image, including red green blue (ROB) components, is input at step 301. At step 302, the input image is processed to identify local regions that likely contain logos and objects using a spectral saliency process. At step 302, spectral saliency region selection is 15 computed, for example, by performing a discrete cosine transform (DCT) of each local region. At step 303, the image from step 301 is converted to hue, saturation, value (HSV) planes 311, while at step 304 gradient images 312 are generated by using gradient edge filters.

The gradient images 312 are generated at eight orientations, and an intensity image 310 is also generated. At step 305, a stroke width transform is generated for the image from step 301 followed by text stroke analysis to generate text stroke images 313. At step 320, the HSV images 311, gradient images 312 and intensity image 310, and text stroke images 313 are used to generate histograms and localization data to select and segment logo-like regions. At step 320, spatial and object like saliency is measured by calculating similarity for HSV histograms and for gradient orientation histograms at multiple scales, and using stroke statistics to determine textual saliency at multiple scales. In general, a "saliency" image is bright where a desired kind of image object is likely and dark otherwise.

At step 321, a refined segmentation is performed using the stroke width images 313, segmentation with a graph method, and contour analysis of connected components. In image segmentation, a color or intensity image is divided into regions according to one or more criteria. The method generally iterates, either merging or splitting regions to produce a segmentation with fewer or more regions. The split/merge relations from one iteration to the next can be expressed as a graph. A connected component is a foreground shape in a usually binary image of shapes that does not touch any other shape, and which does not consist of separate regions. Mathematically, for any two pixels in the shape, there must be an unbroken path connecting the pixels that is completely within the shape. The contour of the shape is the set of pixels on the edge of the shape. For a binary image, these pixels completely define the shape, so it is intuitive and efficient to define and analyze a shape by its contour. Operations include finding a minimum bounding-box for the contour and approximating it by a set of line segments or curves. In general, contour analysis extracts geometric information from a set of contour pixels.

At step 322, segments for a particular logo selected from one of the logo-like regions are generated and at step 323, a location and an image for the particular logo are generated for further processing. Once the particular logo is recognized, an indicator that identifies the recognized logos can be logged and stored as metadata associated with the content.

Figure 4A:
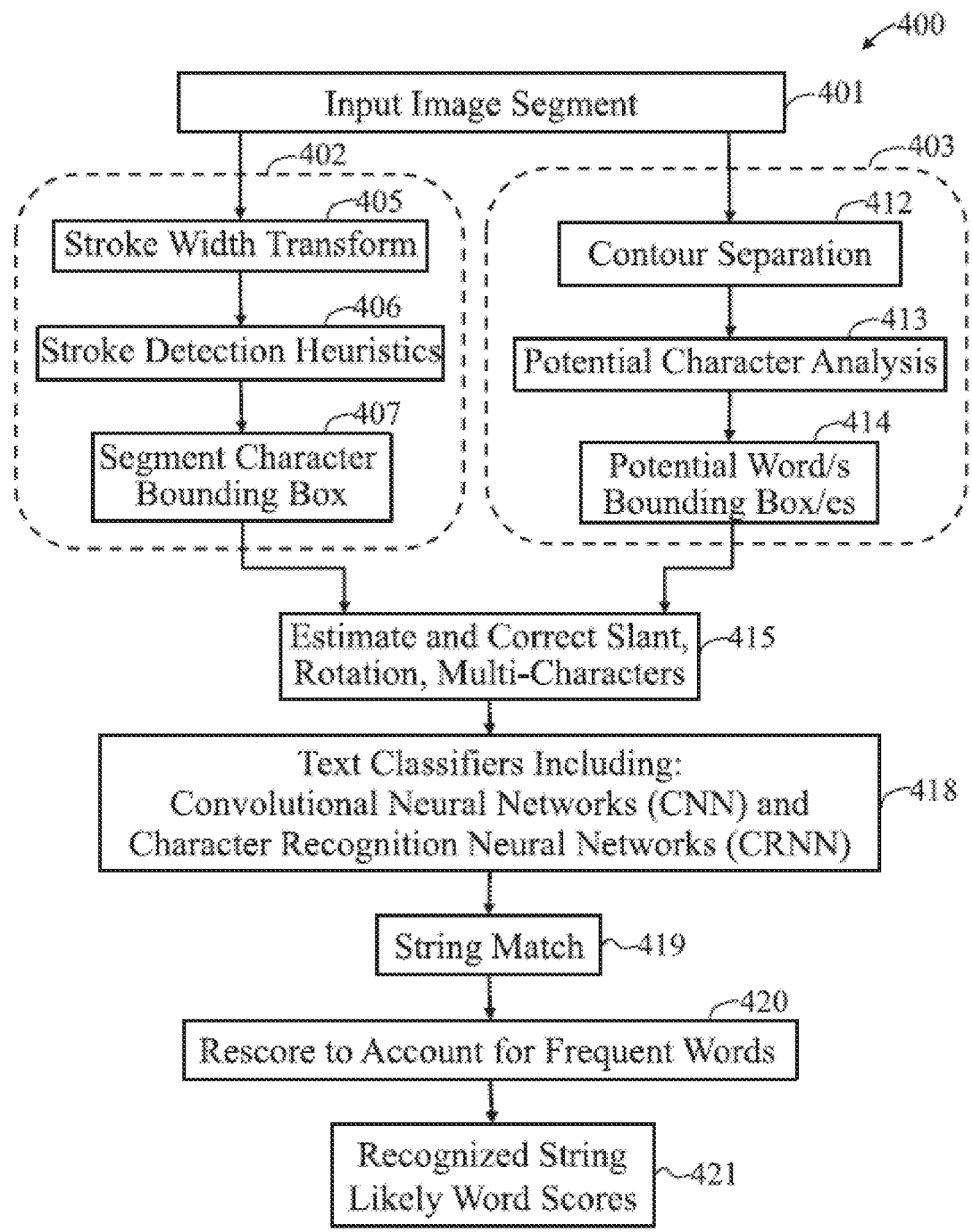
FIG. 4A illustrates a flowchart of a process for character segmentation in accordance with an embodiment of the present invention.

FIG. 4A illustrates a flowchart of a process 400 for character segmentation in accordance with an embodiment of the present invention. An image segment is input at step 401. The process 400 illustrates steps for character segmentation of the image segment input at step 401 using a first stroke analysis process 402 including steps 405, 406, and 407 and using contour analysis of connected components, also referred to as a connected contour analysis process 403 including steps 412, 413, and 414.

Within the image segment from step 401, an image blob may be separated into more distinct characters based on an analysis of contours of image sections which make up the image blob. The contour based separation of characters generally requires alignment of a number of detected and separated contours, such as three isolated contours. The first stroke analysis process 402 also addresses fewer than three separated contours which occurs many times for connected and touching characters. The first stroke analysis process 402 also optimizes processing steps, such as avoiding three additional rotations and image inversions to detect light on dark and vice-versa.

At step 405, a stroke width transform (SWT) analysis generates stroke statistics and, at step 406, stroke detection heuristics are suitably employed. A stroke-width transform analyzes an image to create a second image in which (a) background pixels are 0-valued and (b) every pixel in a foreground stroke or region has a value equal to an estimated minimum width of the region or stroke through that pixel. From this, at step 407, a connected-component analysis is done, for example, which labels each separate foreground stroke or region with a different integer label and can compute a minimum bounding box for said stroke or region.

The connected contour analysis process 403 provides contour based character segmentation which includes contour separation, at step 412. Then at step 413, the input image segment is analyzed to find two or more closely spaced but separated image blobs each having a potential character, then at step 414, the three potential characters are analyzed to find potential text segments, including one or more words using word bounding boxes. Process 403, including steps 412, 413, and 414, is performed for three 90 degree rotations of the input image segment if only the connected contour analysis process 403 is used. Also, for each potential text segment having a set of likely words, it is determined whether a horizontal alignment slant is present in text alignment or a vertical slant is present in the text alignment. At step 415, the process 400 corrects for these alignment slants. Further, at step 415, the process 400 performs a vertical transition analysis and a stroke density analysis. For each detected contour, an estimate is made whether the image segment from step 401 comprises multiple characters. This estimate is made with heuristics of character height, width, transition in stroke density, and overall segment character geometry statistics.

The first stroke analysis process 402 makes a significant improvement over the connected contour analysis process 403 of connected components for finding characters that are connected to each other and do not have three closely spaced but separated image blobs.

A second SWT analysis, including steps 418-421, provides improvements to the character segmentation results provided by the first stroke analysis process 402 and this is an iterated step to partition difficult joined characters.

The stroke detection heuristics 406 is also utilized to select from a set of text classifiers so that improved matching occurs.

At step 418, two sets of character recognition models, also referred to as text classifiers, are described such as a first text classifier using a convolutional neural networks (CNN) and a second text classifier using a character recognition neural network (CRNN), to allow more robust text matching. Training of the two text classifiers is performed, for example, with two methods. A first method utilizes characters of various font types that are placed in training sets of character images for the first text classifier, the CNN. A second method utilizes characters of logos of the likely brands in training sets of character images for the second text classifier, the CRNN. In order to scale to large logo sets, and to be able to add new logos associated with new brands very quickly, a combination of the first text classifier and the second text classifier is employed. At step 418, the first text classifier, the CNN, produces a first set of character strings and the second text classifier, the CRNN, produces a second set of character strings. Both of the two sets of character strings likely contain characters that are used in the brand logos that are likely to be encountered.

At step 419, string matching is performed for the two sets of character strings produced by step 418 against a set of logos for brand name products. Further, at step 420 rescoring is performed on how well each character string matches to a particular logo. Such rescoring can be used to reduce the score for frequently occurring words that are not likely to be included in a logo in order to reduce false positives. Strings that represent potential matches to frequent words are required to match visually or as determined by a neural network classifier and also the font types are to be declared a match. In step 421, the process 400 produces a recognized string including likely word scores.

SWT heuristics are used to segment characters and classify text. For example, an SWT analysis is applied to an input image to produce stroke statistics for a potential set of letters. The SWT analysis results are then evaluated for height, width, number of strokes, strokes traversed in a vertical direction, and strokes traversed in a horizontal direction to determine characters of a text segment in the input image.

The SWT stroke statistics results are also evaluated with heuristics to segment characters. For example, a typical character width to height ratio is used that ranges from 0.15 of height of a thin letter, such as "I" to 1.5 of height for a wide letter, such as "W". Stroke width median values and stroke median separation values are used to refine the above range using heuristic rules. For example, if a median stroke has a measured value S, and a median stroke separation has a measured value P, then a minimum letter width is considered to have a width S and a minimum letter separation is considered to have a separation S+P. Also, for example, a maximum letter width may be set to a width 3S+2P and a maximum letter separation may be set to a separation 3S+3P. It is appreciated that different fonts and font sizes may utilize different heuristics in this evaluation.

Heuristics on the nature of contours are used to estimate stroke characteristics of the potential characters in the input image. For example, in many fonts, the letter "I" consists of one stroke, the letter "D" consists of two strokes, and more complex letters consist of three or more strokes.

In a first step, combine arcs returning to a vertical stroke, such as contained in the letters "b" and "d" and a vertical stroke may be in the letter "a", while a vertical stroke would not likely be in the letter "e". Also, an order of the strokes is identified, such as the vertical stroke in a "b" is determined first for scanning left to right, while the vertical stroke in a "d" is the second stroke determined for scanning left to right.

In a second step, connect arcs at 45 degrees (N, M, Z, W) and split arcs at 90 degrees turn from start point. In a third step, tolerate some error by allowing overlapping boxes.

Figure 4B:
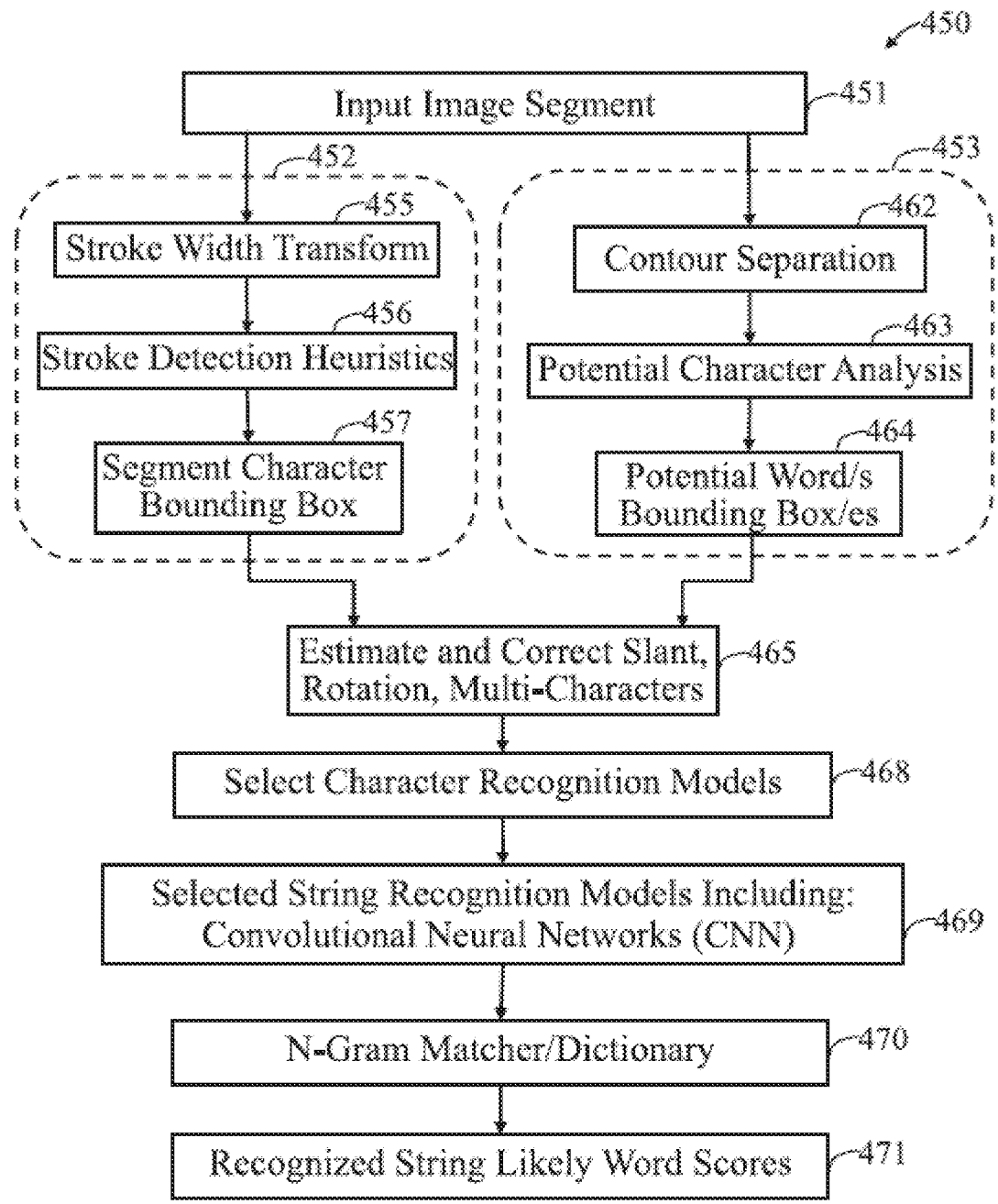
FIG. 4B illustrates a flowchart of a process for character recognition in accordance with an embodiment of the present invention.

Steps for stroke width transform (SWT) analysis, such as used in FIG. 4B, are described next. Elements of the SWT analysis include, for example, detecting strokes and their respective widths. An initial value of each of the elements of the SWT analysis is set to a very large number to represent the effects of the number being infinite (∞). In order to recover strokes, edges in the image are computed using a Canny edge detector. After edges are detected in the input image, a gradient direction of every pixel p, along a detected edge is considered. If the pixel p lies on a stroke boundary then dp must be roughly perpendicular to the stroke orientation. A ray, as defined by p+dp*n, can be evaluated until another edge pixel q is found. If pixel q is found on the other side of the stroke boundary, then dq is roughly opposite to dp, must be flexible to allow for shadow type fonts, then the ray cuts across the stroke and each pixel "s" along p to q is assigned to a width, determined by the equation (p minus q), unless it has a lower value. If pixel q is not roughly opposite, the ray is discarded.

An overlapping bounding box (BB) algorithm is described next. Characters are suitably represented to allow efficient detection of rotated characters, through use of a permutation of the feature vector. Characters having orientations of zero degrees (0°), 45°, and 90° are able to be detected and regions that overlap suppressed, which may be identified by use of a selected color, based on confidence in the classification.

In another embodiment, strokes are efficiently detected by convolving the gradient field with a set of oriented bar filters. The detected strokes induce the set of rectangles to be classified, which reduces the number of rectangles by three orders of magnitude when compared to the standard sliding-window methods.

FIG. 4B illustrates a flowchart of a process 450 for character recognition in accordance with an embodiment of the present invention. An image segment is input at step 451. The process 450 illustrates steps for character segmentation of the image segment input at step 451 using a second stroke analysis 452 including steps 455, 456, and 457 and using a second contour analysis of connected components 453 including steps 462, 463, and 464.

The second stroke analysis 452 including steps 455, 456, and 457 follows the description of the first stroke analysis process 402 including steps 405, 406, and 407 of FIG. 4A above. Also, the second contour analysis of connected components 453 including steps 462, 463, and 464 follows the description of the connected contour analysis process 403 of connected components including steps 412, 413, and 414 of FIG. 4A above.

The steps for the second contour analysis of connected components 453 include, a step 462 for contour separation, a step 463 that searches for two or more closely spaced but separated image blobs, and then in step 464, searches for potential text segments. Further, for each set of likely words, a determination is made whether there is a horizontal slant in text alignment or a vertical slant, and if such alignment slant or slants are found, a correction is made for these detected slants. The corrections remove any vertical slant from each set of likely words. Further, a vertical transition and stroke density analysis are performed. For each contour, an estimate is made whether the contour is of multiple characters. This estimate is determined with heuristics of character height, width, transition in stroke density, and overall segment character geometry statistics.

A second stroke width transform (SWT) analysis step 455 makes a significant improvement over the second contour analysis of connected components 453 for finding characters that are connected to each other and do not have two or more closely spaced but separated image blobs.

A third SWT analysis including steps 468-470 provides improvements to the accurate character segmentation results provided by the second SWT analysis step 455 and this is an iterated step to partition difficult joined characters and improve confidence in accurate detection, wherein the number of iterations depend on complexity of the joined characters.

The stroke detection heuristics step 456 is also utilized to select from a set of text classifiers so that optimal matching occurs. At step 468, two sets of character recognition models, such as text classifiers are selected to allow more robust text matching. Training of the two text classifiers is performed, for example, with two methods. A first method utilizes characters of various font types that are placed in training sets of characters for the first text classifier. A second method utilizes characters of logos of the likely brands in training sets of characters for the second text classifier. It is noted that images of characters are used in the training sets.

At step 468, appropriate character recognition models are selected, and matched to available and trained neural networks. At step 469, string recognition models including convolutional neural networks with multiple character classifiers are selected as suitable selected character recognition models. At step 470, an N-gram matcher is used to detect likely logos, in conjunction with use of a logo dictionary of likely brand characters and words. The logo dictionary is preferably a small searchable database. The likely brand, if detected, is returned to the media recognition system 100, as shown in FIG. 1A, along with string, location and scores.

Figure 5:
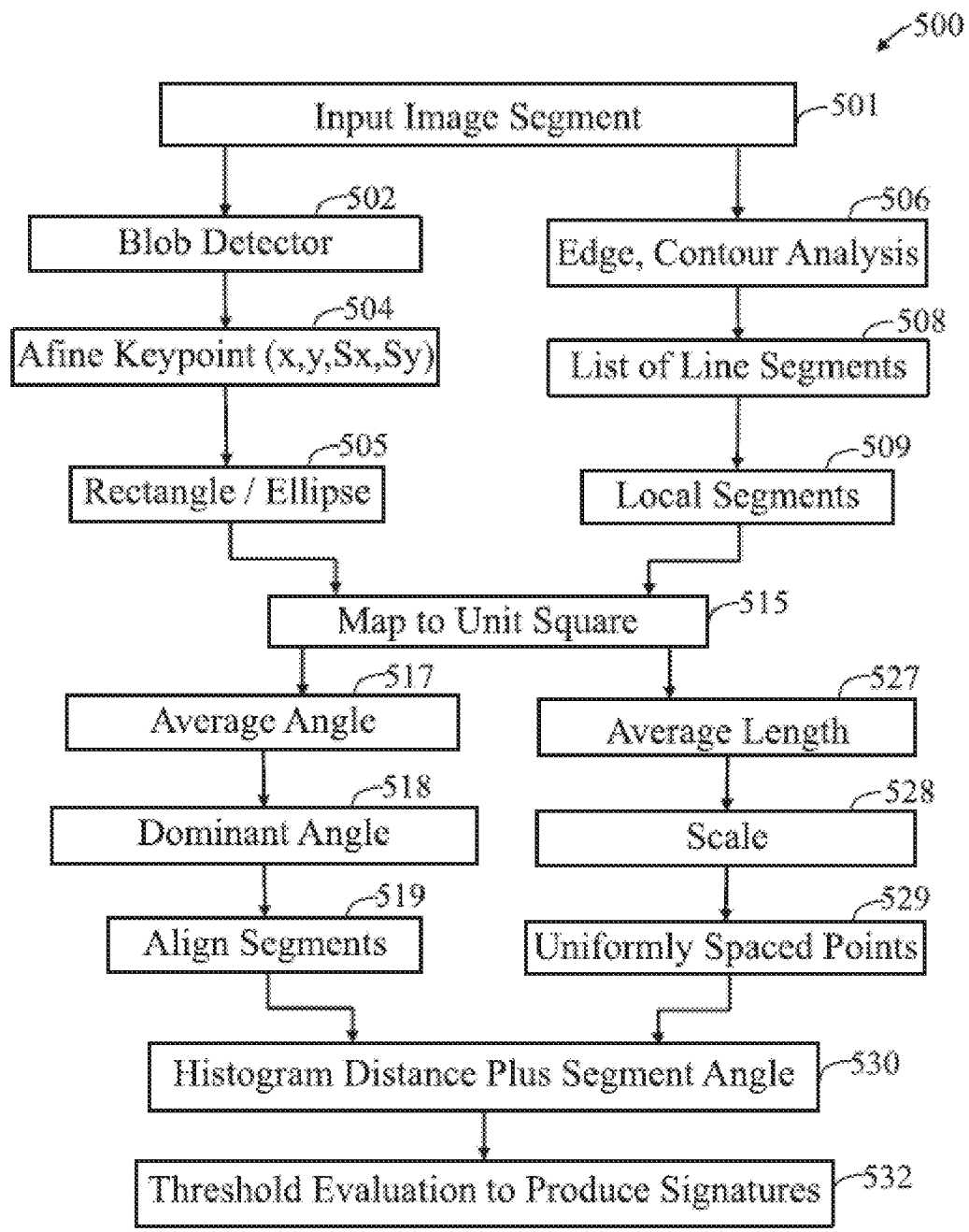
FIG. 5 illustrates a flowchart of a process to generate a line context descriptor in accordance with an embodiment of the present invention.

FIG. 5 illustrates a flowchart of a process 500 to generate a line context descriptor in accordance with an embodiment of the present invention. The line context descriptor generated in process 500 emphasizes the geometric location of contiguous and prominent line segments at a few scales within a region of an image around a detected keypoint. At step 501, an image segment is input and at step 502, the image segment is processed by an interest region detector. At step 504, the interest region detector returns a detected keypoint with attributes of location x, y and multi-scales Sx, Sy. At step 505, an interest region is established around the keypoint, in the form of a rectangle or ellipse, for example, according to the shape of the image region around the keypoint. Other interest region shapes may be used such as a square, a circle, a triangle, a hexagon, and the like.

At step 506, the image segment is processed to detect edges and contours. Next, at step 508, a list of line segments is calculated. At step 509, local segments relevant to each keypoint region according to step 504, such as the ellipse or rectangle, are listed. At step 515, results from steps 505 and 509 are received and overlapping local segments and a region unit, such as a square, are normalized. At step 517, each segment angle is calculated. At step 518, a dominant angle calculation is performed for the region around the detected keypoint. At step 519, each of the calculated segment angles relative to the dominant angle orientation are then calculated.

At step 527, the average length for the region unit is calculated. At step 528, the segments at each scale in the x direction Sx and a different scale in the y direction Sy are calculated. At step 529, segments at uniformly spaced points in the region are calculated. At step 530, a 3D histogram of distance, segment angle, and scale is calculated based on results received from steps 519 and 529 to generate a line context descriptor. At step 532, a threshold is applied to the line context descriptor to produce a signature.

Regarding the edge contour analysis at step 506, to detect edges at different scales, a multi-scale edge detector, such as a multi-scale Canny edge detector or the like, is used with Gaussian derivatives applied at several pre-selected scales in both the x-direction and the y-direction. Two phases are used to remove unstable edges. A first phase applies a Laplacian operator. The edges determined from the first phase results that do not attain a distinctive extremum over scales are removed in the second phase.

The edge pixels are linked to connected curves at different scales. Several cases are considered for representing curves with line segments. For example, a curve is fitted by multiple line segments. Two line segments, having a small gap less than a prespecified gap threshold in between them, are merged into one larger line segment even if they have different scales. For a line segment to survive at a higher scale, the segments must belong to that scale or a higher scale.

For each keypoint, line segments are searched for in the neighborhood of each keypoint. The neighborhood of a keypoint is called a context of the keypoint, and also may be referred to as a context of a feature associated with the keypoint. Line segments lying inside or partially inside the context are called context segments. An initial scale a provides an estimate of the size of a searching area. All the segments in scale level a and lower scales are included in the context as long as part of the segment is within distance kσ, where k is a pre-specified positive value 0<k<10, for example. Segments with very small lengths, less than a pre-specified value, are removed from the image and from further evaluation.

The line context descriptor is based on multiple sampled points as representation of segments in the context. Each sample point has 4 parameters. (1) the distance r to the keypoint. (2) the angle $\alpha$ E [O, . . . , 360) between the direction from keypoint to sample point and reference direction, which is a keypoint dominant orientation. The keypoint dominant orientation is determined from a majority of pixels aligned in a particular orientation in the keypoint neighborhood. (3) the angle $\beta$ E (−180, . . . , 180) between the reference direction and the orientation of an underlying segment. (4) the underlying segment scale σ. After sampling, all the sample points will be used to form the keypoint line context descriptor.

The four parameters for each sample point are used to compute a line context descriptor for each keypoint with a coarse histogram of the sample points at relative coordinates of the line segment sample points. The histogram uses a normalized distance bin to record the sample points in reference to a coordinate system for the neighborhood of a keypoint to vote for the relative distances and thereby weight the sample points. The histogram is generated by binning sample points on selected edges according to angle and distance with reference to a dominant orientation of the selected edges. The accumulated weights from all sample points form a 3D descriptor. The scale σO and one level lower are good estimations for most cases.

Figure 6:
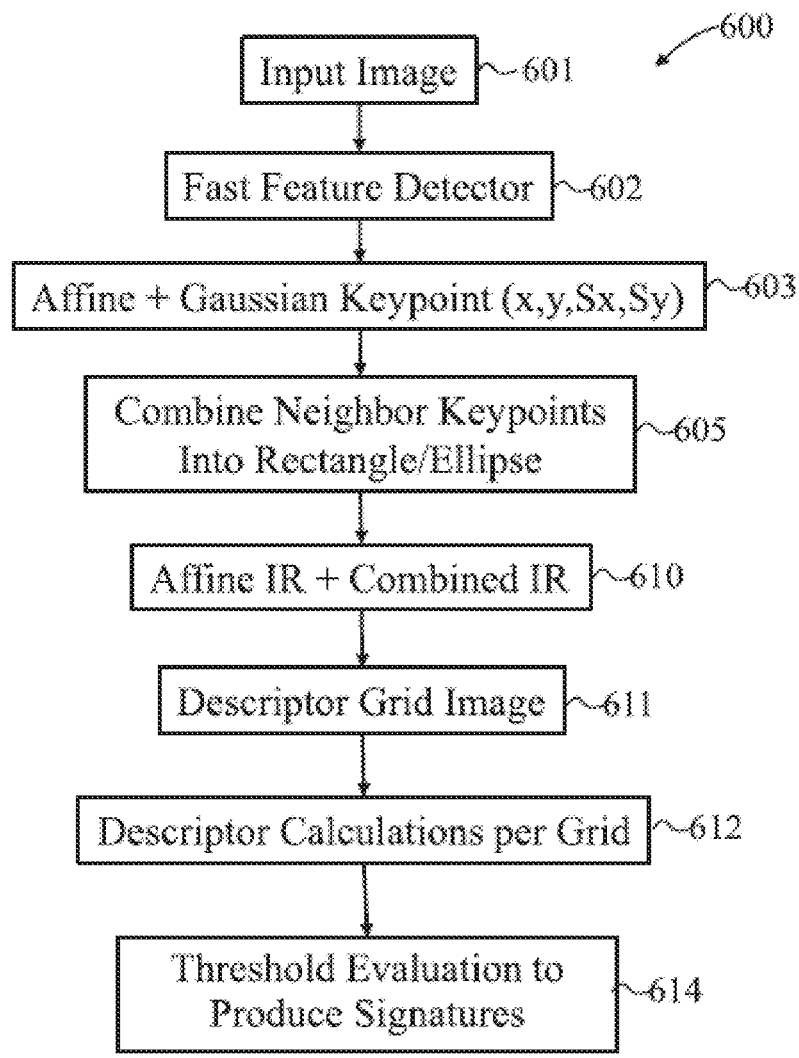
FIG. 6 illustrates a flowchart of a process to generate a descriptor region by extending an affine detector for logo and object detection in accordance with an embodiment of the present invention.

FIG. 6 illustrates a flowchart of a process 600 to generate a descriptor region by extending an affine detector for logo and object detection in accordance with an embodiment of the present invention. The process 600 generates a combined keypoint region and an associated descriptor. The combined keypoint region combines relevant and separated neighboring keypoints to generate a new keypoint region. At step 601, an image is input and at step 602, the input image is processed by a fast interest region detector to determine x and y coordinates of keypoints in associated interest regions. At step 603, an accurate affine and Gaussian Hessian detector is applied to identify a plurality of keypoints. One presently preferred process is described in U.S. Pat. No. 8,189,945 issued May 29, 2012 entitled "Digital Video Content Fingerprinting Based on Scale Invariant Interest Region Detection with an Array of Anisotropic Filters" which is assigned to the assignee of the present application and incorporated by reference herein in its entirety.

The process of step 603 uses an array of filters. The coordinates x and y are 2D coordinates of the keypoint from step 602 and Sx and Sy are scale values in each dimension, such that the array of filters are used to generate the x, y, Sx, Sy values in a 4D space. For fast and accurate calculation of the affine keypoint with Gaussian filters a localized set of filters is calculated, then the peak Hessian is detected followed by interpolation to calculate location (x, y) and scales Sx, Sy.

At step 605, all neighboring keypoints are compared for distance from each other and difference in scales in the x direction and in the y direction. Neighboring keypoints with closest distance to each other, scale agreement, and similar Hessian peak values are combined in a combined neighborhood keypoint. A new region, such as a rectangle or an ellipse, is formed around the combined neighborhood keypoint. At step 610, the combined neighborhood keypoint is used in addition to the original keypoints to describe the segment image.

At step 611, a descriptor grid image is formed. At step 612, a gradient calculation and a phase agreement calculation for each grid point are completed. Also, at step 612, the results of the gradient calculation and phase agreement calculation are normalized and the descriptor is formed by in a binary representation of the results which produces a grid based descriptor. At step 614, the grid based descriptor is further thresholded to generate a signature. Further details on a method to generate a global feature descriptor and signature are provided by U.S. Pat. No. 8,195,689 issued Jun. 5, 2012 entitled "Media Fingerprinting and Identification System" which is assigned to the assignee of the present application and incorporated by reference herein in its entirety.

Figure 7:
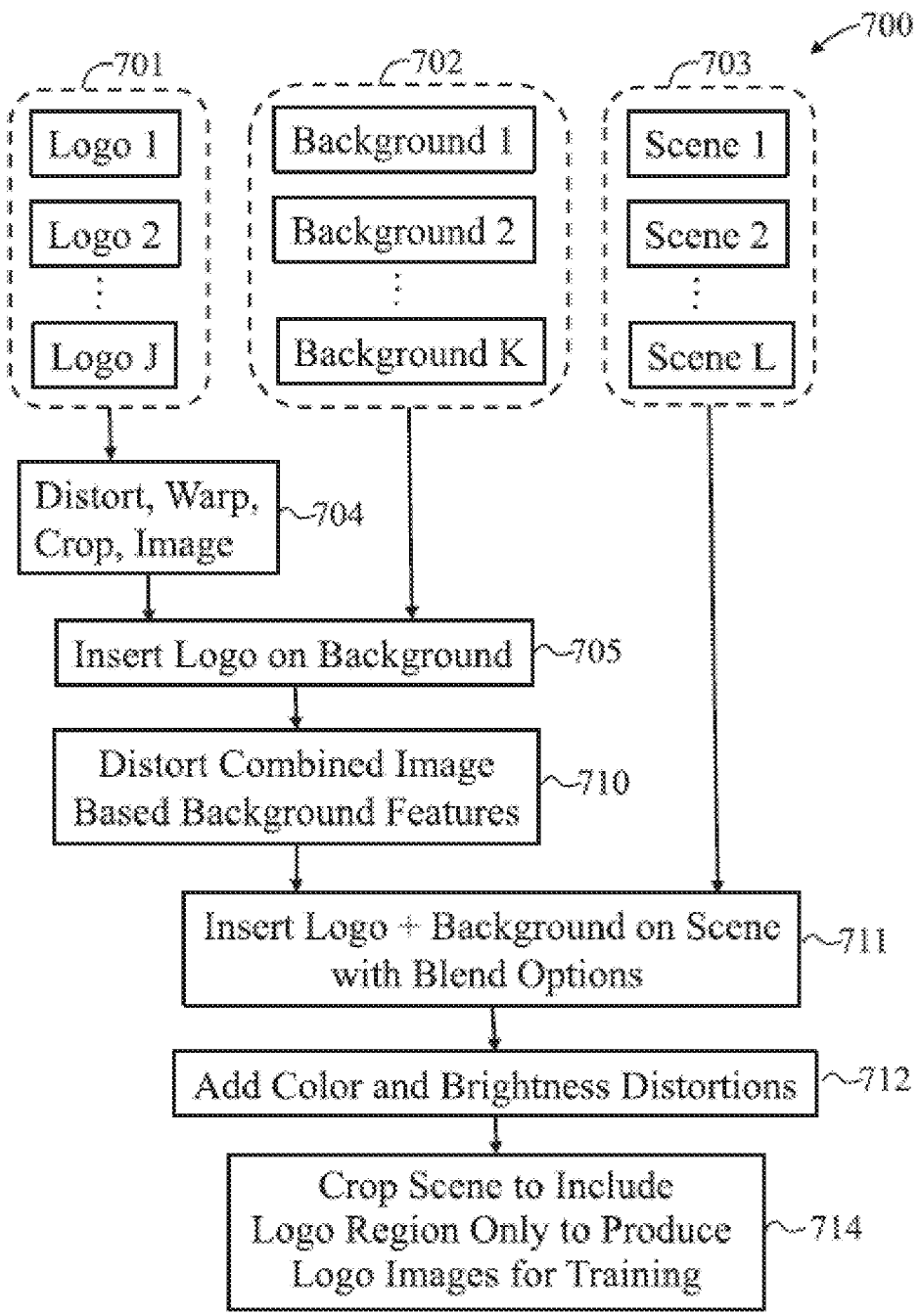
FIG. 7 illustrates a flowchart of a process for synthetic image generation for training neural networks for logo recognition in accordance with an embodiment of the present invention.

FIG. 7 illustrates a flowchart of a process 700 for synthetic image generation for training neural networks for logo recognition in accordance with an embodiment of the present invention. Since it is expected that a logo would be distorted in some manner by the time it is displayed, logos in training sets are also distorted as might be expected. Anticipated distortions that might be expected include, effects due to zooming, changes due to differences in display formats such as for cell phone displays, for tablet and lap top displays, and for displays in home entertainment systems, and the like.

At step 701, a set of expected logo images that are undistorted are input, at step 702, a set of background images are input, and at step 703, a set of scene images are input. Generally, logos are placed on specific backgrounds. However, since the backgrounds may vary, various backgrounds are included in the training sets due to type of material used in the background, such as use of different fabrics, metals, cloths, wall colors, use of wallpaper, lighting, effects due to aging, and the like. At step 704, the received logo images are warped and cropped as might be expected. Other distortion effects may also be applied depending upon a priori knowledge of anticipated effects that might occur on selected logos. At step 705, the distorted logo image is placed on appropriate backgrounds appropriate for that logo creating a set of background distorted logo images. For example, some logos would be placed only on apparel backgrounds, while other logos would be placed only on metallic car backgrounds. At step 710, specific warping and distortions are performed on the set of background distorted logo images creating a distorted logo image with multiple distortions applied to the background and original logo. At step 711, the distorted logo image is inserted by blending the distorted logo image into a scene image with selected blend options. At step 712, color transformations, brightness, and gray image versions are generated. These additional distortions are added as a separate step to encompass all the previous distortion additions. Also at step 712, a further blending of logo image with scene is performed. At step 714, after the color, and brightness distortions have been applied on the distorted logo image at step 712, the distorted logo image is cropped to select regions around the logo to generate a training logo image.

In order to generate synthetic training images for an image classifier including CNN (convolutional neural networks), appropriate logo backgrounds, such as banners, shirts, cars, sails, and the like, and appropriate scene images for backgrounds are selected. For the selected logo, the logo background, and the scene image, appropriate types of distortions are chosen. Also, consideration is given in how a chosen type of distortion is to be applied. For example, types of distortions include selected color distortions and gray distortions. Also, distortions due to blending to merge a selected logo with the selected logo background colors, include, for example, using <10% blending and distortions caused by affine transforms taking into account that some affine transforms are not that effective since the logo has been cropped, warped, and resized. Additional distortions include distortions due to perspective transforms, and distortions due to rotations of up to, for example, +/−12%, and the like.

An alternate set of sequence of steps to generate synthetic logo image segment. At step 701, Select logo, at step 704, choose a logo size, at step 705, choose an impose point to insert the logo, also, at step 705, add logo image on a background selected at step 702, at step 710, distort the logo image on the background using functions to morph, blur, and or warp the selected logo. It is noted that in step 704, distortions may be applied to the logo without the background. At this point, a selected logo image has been distorted and placed on a selected logo background (logo_bg), referred to as a logo_bg image. At step 711, the logo_bg image is inserted on a scene image selected at step 703, at step 712, selected distortions that are applied to the logo_bg image with scene include a color distortion such as a 50% shuffle color, a 50% gray, and a selected color scale, color bias, np and clip, and color invert. Color bias includes red, green, blue bias, np clip is saturation, color invert is where colors are inverted, and the like. At step 711, utilize up to a max 20% blend of the logo_bg image with the selected scene to represent a situation where a background bleeds into the logo image. At step 712, distort the image as described above. At step 714, choose crop points and prepare the distorted logo image for training. It is noted that multiple variations of a logo may exist related to the same product. In such a case, multiple logo representations are used in varying combinations based on many factors, such as image area available to include one or more of the logo representations.

Figure 8A:
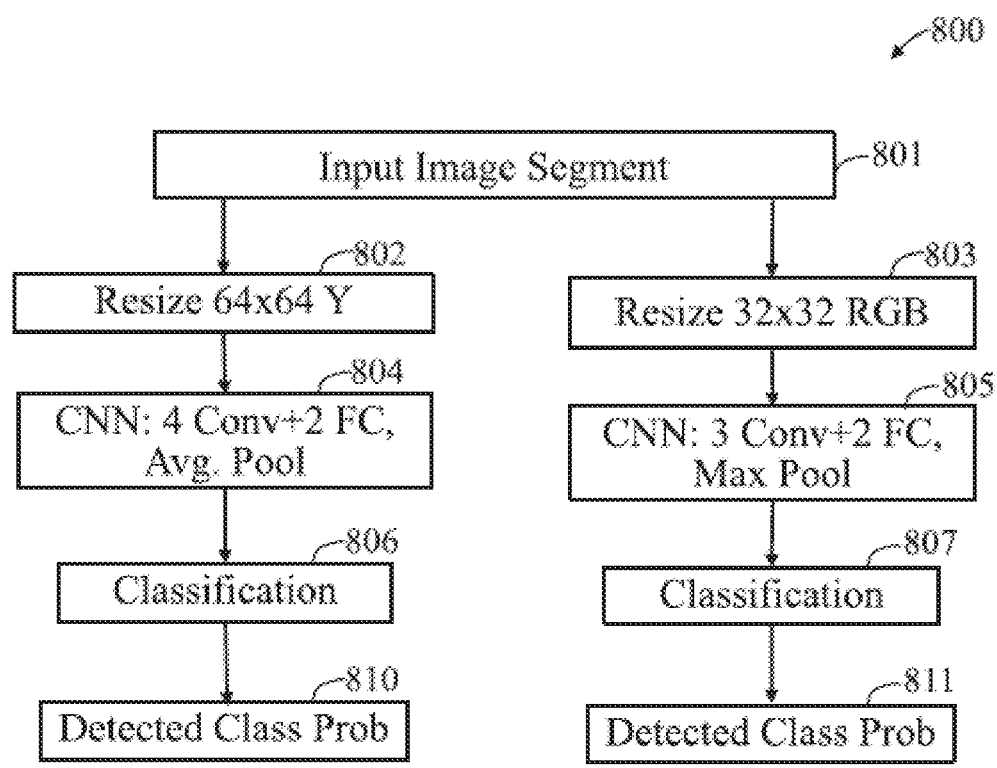
FIG. 8A illustrates a flowchart of a process for optimizing convolutional neural networks (CNNs) for logo recognition in accordance with an embodiment of the present invention.

FIG. 8A illustrates a flowchart of a process 800 for optimizing multi-scale CNNs for logo recognition in accordance with an embodiment of the present invention. At step 801, an image segment is input. At step 802, the input image segment is resized to a 64×64 Y image which is a luminance image. At step 803, the input image segment is resized to a 32×32 ROB image. The 32×32 grid size is an appropriate pre-selected grid for the intended application of processing the ROB image. At step 804, a convolution neural network (CNN) with 4 convolutional layers (4 Conv) and 2 fully connected layers (2 FC) processes the 64×64 Y image. In step 806, classification of the input image segment as processed in step 804 occurs according to specific logo classes.

Similarly, at step 805, a CNN with 3 convolutional layers (3 Conv) and 2 fully connected layers (2 FC) processes the 32×32 ROB image. In step 807, classification of the input image segment as processed in step 805 occurs according to specific logo classes. At steps 810 and 811, detected pre-specified classes and probabilities of detecting the pre-specified classes are returned to the calling program to be used for subsequent processing.

The above process 800 uses an optimized and complementary system. Since the Y luminance image includes most of the useful information, the Y luminance image provides significant accuracy with a 64×64 image as input. The ROB components of the input image segment also provide information that is useful. Accordingly, the 32×32 image grid is considered suitable for recognition. The combined features associated with luminance and RGB processing are classified separately in the embodiment of FIG. 8A. In another embodiment, the last stage of the fully connected layers of each input layer are combined for classification training.

Figure 8B:
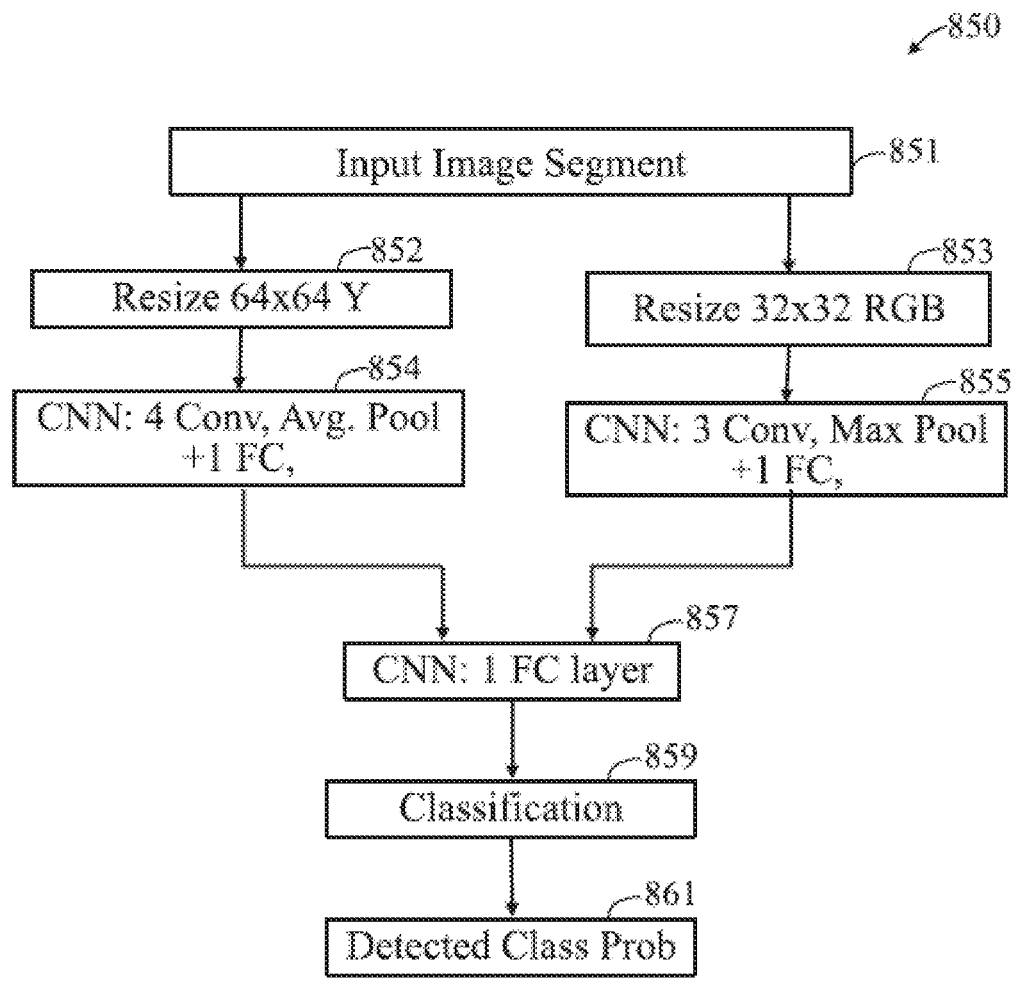
FIG. 8B illustrates a flowchart of a process for optimizing a multi-scale CNN for logo recognition in accordance with an embodiment of the present invention.

FIG. 8B illustrates a flowchart of a process 850 for optimizing a multi-scale CNN for logo recognition in accordance with an embodiment of the present invention. At step 851, an image segment is input. At step 852, the input image segment is resized to a 64×64 Y image which is a luminance image. At step 853, the input image segment is resized to a 32×32 RGB image. At step 854, a convolution neural network (CNN) with four convolutional layers (4 Conv) and one fully connected layer (1 FC) processes the 64×64 Y image. Similarly, at step 855, a CNN with three convolutional layers (3 Conv) and one fully connected layer (1 FC) processes the 32×32 RGB image. At step 857, the outputs of these networks are combined and fully connected. At step 859, the output of the CNN of step 857 is classified according to pre-specific logo classes. At step 861, the detected pre-specified classes and probability of detecting the pre-specified classes are returned to the calling program to be used for subsequent processing.

Figure 8C:
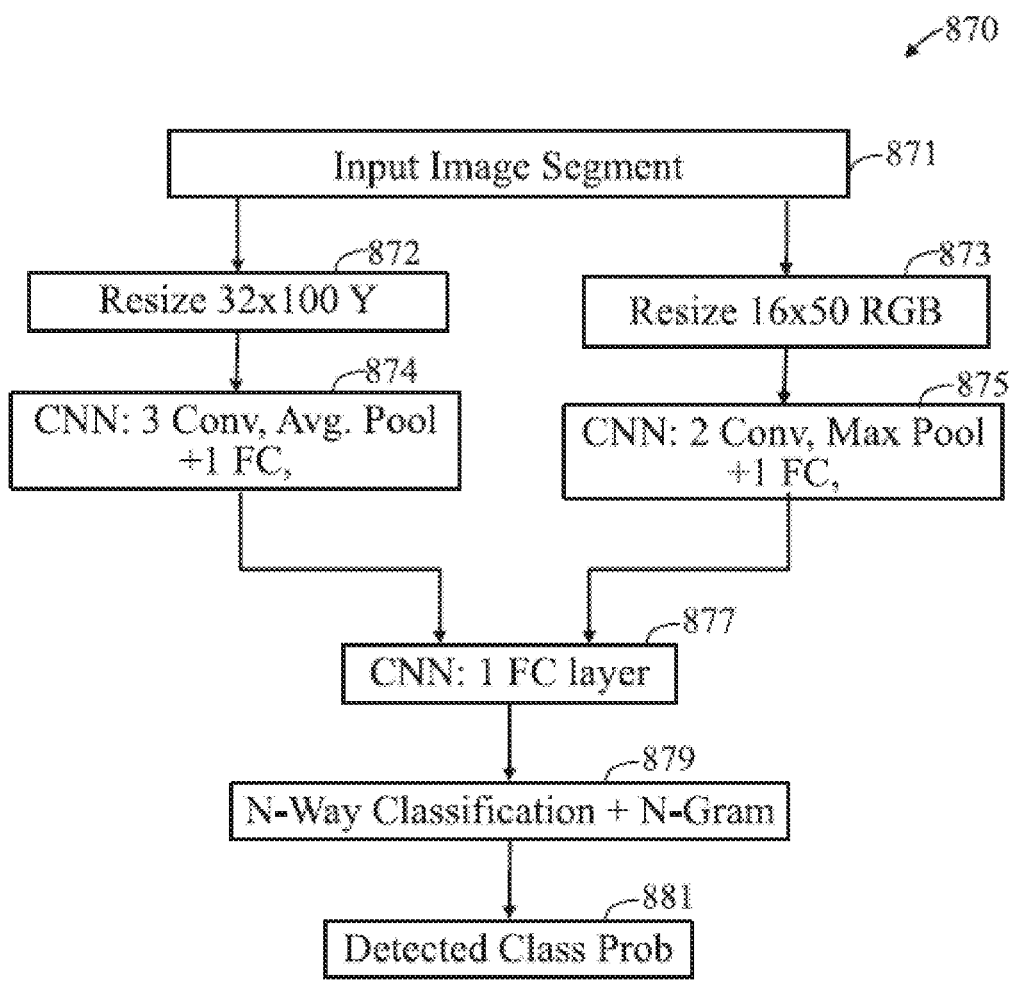
FIG. 8C illustrates a flowchart of a process for logo text recognition using a CNN and an N gram classifier in accordance with an embodiment of the present invention.

FIG. 8C illustrates a flowchart of a process 870 for logo text recognition using a CNN and an N gram classifier in accordance with an embodiment of the present invention. At step 871, an image segment is input. At step 872, the input image segment is resized to a 32×100 Y image which is a luminance image. For logos, it was determined experimentally that a grid size of 32×100 provided better accuracy than a 64×64 grid, especially for text based logos. At step 873, the input image segment is resized to a 16×50 ROB image. For logos, it was determined experimentally that a grid size of 16×50 provided better accuracy than a 32×32 grid, especially for text based logos. At step 874, a convolution neural network (CNN) with three convolutional layers (3 Conv) and one fully connected layer (1 FC) processes the 32×100 Y image. Similarly, at step 875, a CNN with two convolutional layers (2 Conv) and one fully connected layer (1 FC) processes the 16×50 ROB image. At step 877, the outputs of these networks are combined and fully connected. At step 879, the output of the CNN of step 877 is classified by an N-way classification process and an N-gram string matching process according to pre-specific logo classes. At step 881, the detected N-gram string and probability of the detected classes are returned to the calling program to be used for subsequent processing.

The above process 870 uses an optimized and complementary system. Since the Y luminance image includes most of the useful information, the Y luminance image provides significant accuracy with a 32×100 image as input. The ROB components of the input image segment also provide information that is useful. Accordingly, the 16×50 image grid is considered suitable for recognition.

An N-gram is a sequence of N items from a sequence of text or speech. The items can be phonemes, syllables, letters, words, or the like. The N-gram string matching process utilized in step 879, also known as N-gram logistic training, comprises beginning with selecting a value for Nanda word to be evaluated. In more detail, an N-gram (ON) of word (w) is a substrings of length up to N letters:

$$GN(w)=\{s{:}s \subset w \wedge |s| \leq N\} \qquad \text{equation 1}$$

with GN=∪ w ∈ WGN(w) the set of all such grams in the language. For example, for N=3, and w=spires, G3 (spires)= {s, p, i, r, e, s, sp, pi, ir, re, es, spi, pir, ire, res}.

Given w, the system predicts a vector using the same base CNN, and a connected layer with IGN I neurons to represent the encoding vector. The GN scores of the fully connected layer are probabilities of an N-gram being present in the image segment. The CNNs of steps 874, 875, and 877 together are therefore learning to recognize the presence of each N-gram somewhere within the input image.

The training problem becomes that of IGNI separate binary, true positive match and zero false match, classification tasks, and the logistic regression loss is back-propagated with respect to each N-gram class independently, which represents a logistic regression. A logistic loss function is defined as:

$$V(f(\bar{x}), y) = \frac{1}{\ln 2}\ln\left(1 + e^{-yf(\bar{x})}\right)$$

This function displays a similar convergence rate to a hinge loss function, and since it is continuous, gradient descent methods can be utilized. However, the logistic loss function does not assign zero penalty to any points. Instead, functions which correctly classify points with high confidence, that is high values of |f(x)|, are penalized less. This structure leads the logistic loss function to be sensitive to outliers in the data. The logistic loss function holds some balance between the computational attractiveness of the square loss function and the direct applicability of the hinge loss function.

To jointly train a range of N-grams, some occurring frequently and some rarely, the gradients for each N-gram class are scaled by the inverse frequency of the N-gram class appearance in the training word corpus.

Figure 9:
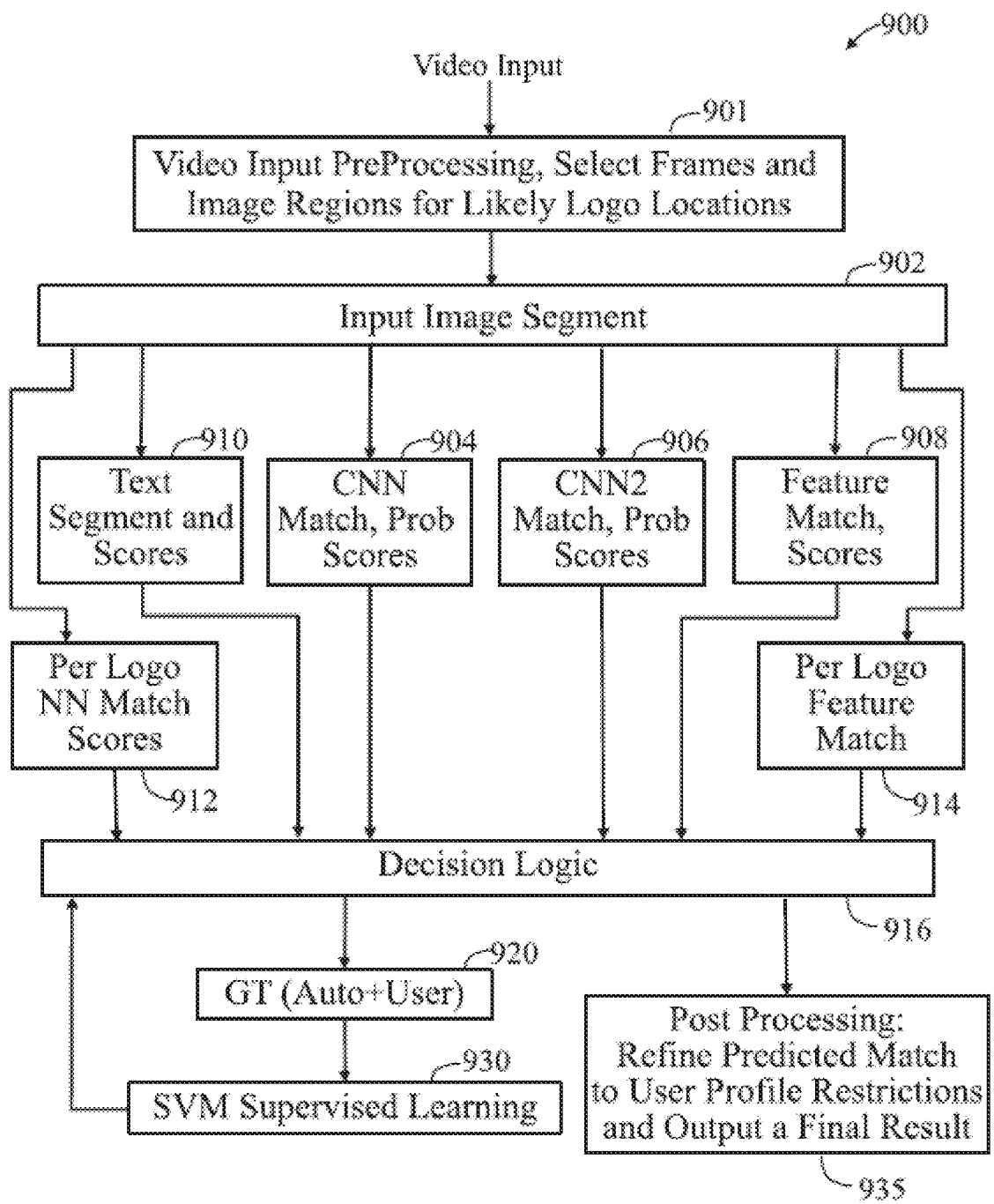
FIG. 9 illustrates a flowchart of a process including detection logic for logo recognition in accordance with an embodiment of the present invention.

FIG. 9 illustrates a flowchart of a process 900 including detection logic for logo recognition in accordance with an embodiment of the present invention. At step 901, a video input is received and pre-processed to select frames and image regions within the selected frames for likely logo locations. At step 902, the likely logo locations are further processed into image segments. At step 904, the image segments are input to be processed by multiple recognition methods. For example, at step 904, the input image segments are applied to a first convolutional neural network (CNN) classifier and a first set of probability scores for pre-specified logos is produced. At step 906, the input image segments are applied to a second CNN classifier and a second set of probability scores for the pre-specified logos is produced. At step 908, the input image segments are analyzed to generate a set of features which are then matched to known features resulting in a third set of probability scores for the pre-specified logos. At step 910, optical character recognition is used to generate candidate character strings which are matched to a set of words known to be used in logos resulting in a fourth set of probability scores for the pre-specified logos and text segments.

If the above steps 904, 906, 908, and 910 generate a high confidence match with known input segments, then at step 916, decision logic selects the high confidence match and passes this result to step 920, representing a matched brand, a location on an image from which the input image segment was selected, and the individual sets of scores.

In case a high confidence match is not obtained, such as having the steps 904, 906, 908, and 910 produce inconsistent results or produce generally weak scores from each step, then two additional verification methods are used. At step 912, a per logo specific neural network (NN) or classifier trained to detect that pre-specified and specific logo evaluates the input image segments. Also, at step 914, a per logo feature matcher evaluates the input image segments. The input image segments from step 902, are further evaluated in the neighborhoods of the likely matches to produce new overlapping segments or combined segments or new segments. The outputs from steps 912 and 914 are then considered along with outputs from the steps 904, 906, 908, and 910 at step 916, by the decision logic. A high confidence match, if obtained, is output from step 916 as a match to step 920.

Since neural networks and feature matching approaches generally improve their classification results through learning using training images, a continuous training approach is taken to improve the decision logic at step 916. At step 920, ground truth (GT) logo-like segments that match segments in actual logos are input to automatically verify matches identified at step 910. At step 920, a user could also check the match results to verify the matches are of good quality. The above ground truth logo-like segments are used to train a support vector machine (SVM) or an ensemble classifier at step 930. The results of step 930 are provided as feedback to step 910 and evaluated by the decision logic directly or fed back as a weighted input. If the evaluation of the step 930 results are of sufficient quality, as determined, for example, by whether the results exceed a match probability threshold, a high confidence match is produced as a final result output to post processing step 935. It is also noted that some identified characters may have a high match probability and other identified characters may have a lower match probability. Such situations are indicated at step 935 in the final result output. The number of iterations of steps 916, 920, and 930 are also taken into account against a pre-specified iteration limit to determine at step 935, the final result output. At step 935, the post processing refines a predicted match to a user's profile restrictions and outputs a final result. Once a logo is recognized, an indicator that identifies the recognized logos can be logged and stored as metadata associated with the content.

With every high confidence match, as identified from step 930 and that is fed back to step 916, the neural networks, of steps 904, 905, and 912, and feature classifiers, of steps 908 and 914, learn and improve the accuracy of their internal processes. Thus, the identified process of continuously training is adopted into the flow of process 900. The continuous training system may be enhanced by allowing undetected or new logo images and relevant data to be added into the system.

Another embodiment of a continuously learning system allows undetected or new logo images to be added into the system at each step. The new input logo images and relevant data should be added to existing brands or new brands at the following steps: (i) Adding to feature matching references after stop word processing; (ii) training image generation for CNNs for logo classifiers at steps 904 and 906; (iii) training segment based OCR recognizer at step 910; (iv) adding the new text strings to match for character based OCR in step 910; (v) training the per logo NN recognizer or classifier in steps 912 and 914; (vi) training the text string weighting to reflect more frequent words; (vii) training to reflect the association or correlation with topic of associated content; and (viii) training with false positive examples at synthetic image generation, and at decision SVM logic; and (ix) training with missing true positive examples at synthetic image generation, and decision SVM logic.

Figure 10:
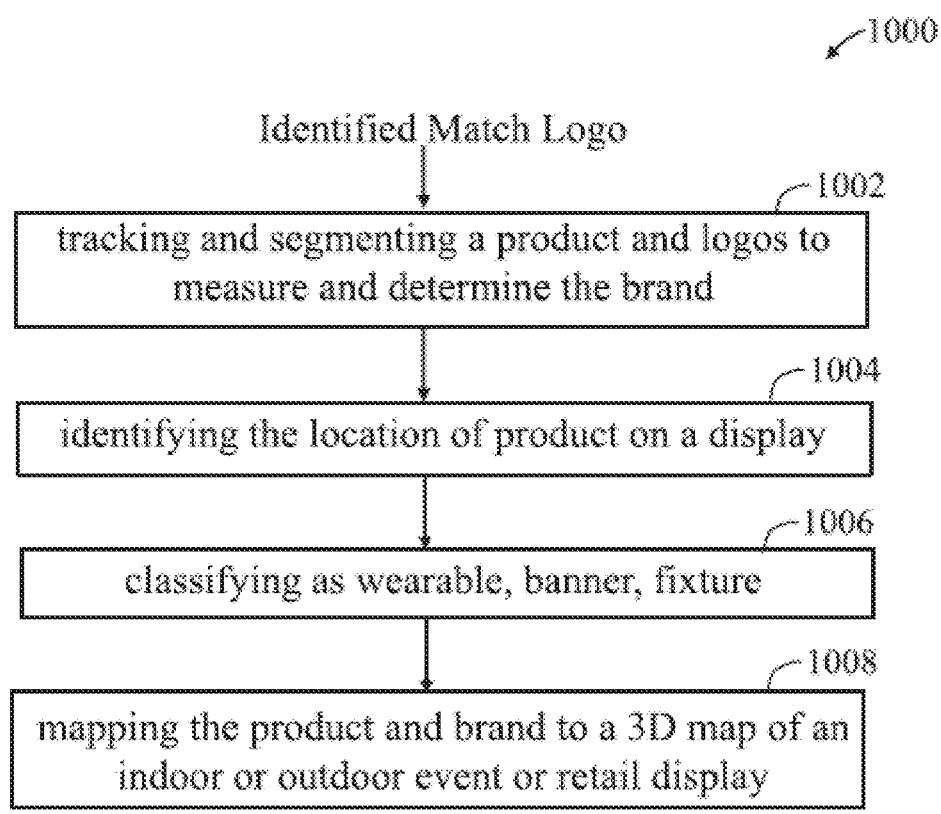
FIG. 10 illustrates a flowchart of a process for tracking and mapping of a product brand and logo to a three dimensional (3D) physical location of an indoor or outdoor event or retail display in accordance with an embodiment of the present invention.

FIG. 10 illustrates a flowchart of a process 1000 for tracking and mapping of a product brand and logo to a 3 dimensional (3D) physical location of an indoor or outdoor event or retail display in accordance with an embodiment of the present invention. The process 1000 is useful for broadcast TV and TV screen applications in video personalization.

At step 1002, a received identified match logo is tracked and the logo and associated product is segmented and measured to determine a brand. At step 1004, a location where the product and logo are placed is identified. At step 1006, the logo is classified as being for a wearable product, located on a banner, or on a fixture. At step 1008, the product and brand are mapped to a 3D physical location at an indoor or outdoor event or retail display.

Those of skill in the art will appreciate from the present disclosure additional, alternative systems and methods to associated multimedia tags with user comments and user selected multimedia snippets for efficient storage and sharing of tagged items between users, based on television program audio and video content fingerprinting, in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention.

The invention claimed is:

1. A method to detect a particular brand in images from a video stream, the method comprising:
    segmenting and measuring a detected logo and its associated product to determine a brand;
    identifying a physical location of the detected logo and product;
    classifying the logo as being on a wearable product, located on a banner, or on a fixture; and
    mapping the product and brand to a three-dimensional (3D) map of an event where the logo and product were detected.

2. The method of claim 1, wherein:
    the logo and product are located in a retail display;
    identifying the physical location of the logo and product comprises identifying a physical location of the retail display; and
    the 3D map of the event identifies the physical location of the retail display.

3. The method of claim 1, wherein:
the logo and product are located for display in an outdoor setting;
identifying the physical location of the logo and product comprises identifying a physical location in the outdoor setting; and
the 3D map of the event identifies the physical location in the outdoor setting.

4. The method of claim 1, further comprising detecting the logo in the images by:
applying a saliency analysis and segmentation of selected regions in a selected video frame of the video stream to determine segmented likely logo regions;
processing the segmented likely logo regions with feature matching using correlation to generate a first match, neural network classification using a convolutional neural network to generate a second match, and text recognition using character segmentation and string matching to generate a third match;
deciding a most likely logo match by combining results from the first match, the second match, and the third match; and
detecting the logo as the most likely logo match.

5. The method of claim 4, wherein applying the saliency analysis comprises:
applying a discrete cosine transform (DCT) on the segmented likely logo regions of an image in the selected video frame to determine spectral saliency of each segmented likely logo region.

6. The method of claim 5, wherein applying the saliency analysis further comprises:
measuring multi-scale similarity at two higher scales and a smaller scale of the spectral saliency of each likely logo region, wherein the multi-scale similarity measures include orientation gradient histograms, hue, saturation, value (HSV) histograms, and stroke width transform (SWT) statistics including total number of strokes, number of horizontal strokes, number of vertical strokes, stroke density, and number of loops.

7. The method of claim 4, wherein applying the segmentation comprises:
applying a stroke width transform (SWT) analysis to the selected regions to generate SWT statistics;
applying a graph-based segmentation algorithm to establish word boxes around likely logo character strings; and
analyzing each of the word boxes to produce a set of character segmentations to delineate the characters in the likely logo character strings.

8. A computing system comprising:
one or more processors; and
a non-transitory, computer-readable medium storing instructions that, when executed by the one or more processors, cause the one or more processors to perform a set of operations for detecting a particular brand in images from a video stream, the set of operations comprising:
segmenting and measuring a detected logo and its associated product to determine a brand;
identifying a physical location of the detected logo and product;
classifying the logo as being on a wearable product, located on a banner, or on a fixture; and
mapping the product and brand to a three-dimensional (3D) map of an event where the logo and product were detected.

9. The computing system of claim 8, wherein:
the logo and product are located in a retail display;
identifying the physical location of the logo and product comprises identifying a physical location of the retail display; and
the 3D map of the event identifies the physical location of the retail display.

10. The computing system of claim 8, wherein:
the logo and product are located for display in an outdoor setting;
identifying the physical location of the logo and product comprises identifying a physical location in the outdoor setting; and
the 3D map of the event identifies the physical location in the outdoor setting.

11. The computing system of claim 8, the set of operations further comprising detecting the logo in the images by:
applying a saliency analysis and segmentation of selected regions in a selected video frame of the video stream to determine segmented likely logo regions;
processing the segmented likely logo regions with feature matching using correlation to generate a first match, neural network classification using a convolutional neural network to generate a second match, and text recognition using character segmentation and string matching to generate a third match;
deciding a most likely logo match by combining results from the first match, the second match, and the third match; and
detecting the logo as the most likely logo match.

12. The computing system of claim 11, wherein applying the saliency analysis comprises:
applying a discrete cosine transform (DCT) on the segmented likely logo regions of an image in the selected video frame to determine spectral saliency of each segmented likely logo region.

13. The computing system of claim 12, wherein applying the saliency analysis further comprises:
measuring multi-scale similarity at two higher scales and a smaller scale of the spectral saliency of each likely logo region, wherein the multi-scale similarity measures include orientation gradient histograms, hue, saturation, value (HSV) histograms, and stroke width transform (SWT) statistics including total number of strokes, number of horizontal strokes, number of vertical strokes, stroke density, and number of loops.

14. The computing system of claim 11, wherein applying the segmentation comprises:
applying a stroke width transform (SWT) analysis to the selected regions to generate SWT statistics;
applying a graph-based segmentation algorithm to establish word boxes around likely logo character strings; and
analyzing each of the word boxes to produce a set of character segmentations to delineate the characters in the likely logo character strings.

15. A non-transitory, computer readable medium storing instructions that, when executed by one or more processors, cause the one or more processors to perform a set of operations for detecting a particular brand in images from a video stream, the set of operations comprising:
segmenting and measuring a detected logo and its associated product to determine a brand;
identifying a physical location of the detected logo and product;
classifying the logo as being on a wearable product, located on a banner, or on a fixture; and mapping the product and brand to a three-dimensional (3D) map of an event where the logo and product were detected.

16. The non-transitory, computer readable medium of claim 15, wherein:

the logo and product are located in a retail display;

identifying the physical location of the logo and product comprises identifying a physical location of the retail display; and the 3D map of the event identifies the physical location of the retail display.

17. The non-transitory, computer readable medium of claim 15, wherein:

the logo and product are located for display in an outdoor setting;

identifying the physical location of the logo and product comprises identifying a physical location in the outdoor setting; and the 3D map of the event identifies the physical location in the outdoor setting.

18. The non-transitory, computer readable medium of claim 15, the set of operations further comprising detecting the logo in the images by:

applying a saliency analysis and segmentation of selected regions in a selected video frame of the video stream to determine segmented likely logo regions;

processing the segmented likely logo regions with feature matching using correlation to generate a first match, neural network classification using a convolutional neural network to generate a second match, and text recognition using character segmentation and string matching to generate a third match;

deciding a most likely logo match by combining results from the first match, the second match, and the third match; and detecting the logo as the most likely logo match.

19. The non-transitory, computer readable medium of claim 18, wherein applying the saliency analysis comprises:

applying a discrete cosine transform (DCT) on the segmented likely logo regions of an image in the selected video frame to determine spectral saliency of each segmented likely logo region.

20. The non-transitory, computer readable medium of claim 18, wherein applying the segmentation comprises:

applying a stroke width transform (SWT) analysis to the selected regions to generate SWT statistics;

applying a graph-based segmentation algorithm to establish word boxes around likely logo character strings; and analyzing each of the word boxes to produce a set of character segmentations to delineate the characters in the likely logo character strings.

* * * * *